US011846769B2

United States Patent
Nakamura

(10) Patent No.: US 11,846,769 B2
(45) Date of Patent: Dec. 19, 2023

(54) IMAGE PROCESSING APPARATUS, IMAGE PROCESSING METHOD, AND PROJECTION APPARATUS

(71) Applicant: SONY SEMICONDUCTOR SOLUTIONS CORPORATION, Kanagawa (JP)

(72) Inventor: Masashi Nakamura, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 923 days.

(21) Appl. No.: 16/613,922

(22) PCT Filed: May 11, 2018

(86) PCT No.: PCT/JP2018/018233
§ 371 (c)(1),
(2) Date: Nov. 15, 2019

(87) PCT Pub. No.: WO2018/216498
PCT Pub. Date: Nov. 29, 2018

(65) Prior Publication Data
US 2021/0333541 A1    Oct. 28, 2021

(30) Foreign Application Priority Data
May 25, 2017  (JP) .................. 2017-103293

(51) Int. Cl.
*G02B 26/10* (2006.01)
*G03B 21/20* (2006.01)
(Continued)

(52) U.S. Cl.
CPC ....... *G02B 26/101* (2013.01); *G03B 21/2033* (2013.01); *H04N 9/3129* (2013.01); *H04N 9/3182* (2013.01); *H04N 9/77* (2013.01)

(58) Field of Classification Search
CPC ..... G03B 21/00–64; H04N 9/31–3197; H04N 9/00–898
See application file for complete search history.

(56) References Cited

U.S. PATENT DOCUMENTS

2006/0050181 A1* 3/2006 Chen ....................... H04N 9/67
348/607
2009/0219493 A1  9/2009 Okubo et al.
(Continued)

FOREIGN PATENT DOCUMENTS

CN    103517015 A    1/2014
JP    2003-021800 A  1/2003
(Continued)

OTHER PUBLICATIONS

International Search Report and Written Opinion of PCT Application No. PCT/JP2018/018233, dated Aug. 7, 2018, 10 pages of ISRWO.

Primary Examiner — Bao-Luan Q Le
Assistant Examiner — Christopher A Lamb, II
(74) Attorney, Agent, or Firm — CHIP LAW GROUP

(57) ABSTRACT

The present technology relates to an image processing apparatus, an image processing method, and a projection apparatus that can improve brightness of a projected image while satisfying a safety standard for laser products. A saturation emphasis processing unit determines, in accordance with saturation of an image, a first emphasis coefficient that emphasizes luminance of the image, and converts a luminance signal of the image on the basis of the determined first emphasis coefficient. The present technology can be applied to, for example, a laser beam scanning type projection apparatus or the like that performs scanning with a laser beam as a light source.

13 Claims, 20 Drawing Sheets

(51) Int. Cl.
*H04N 9/31* (2006.01)
*H04N 9/77* (2006.01)

(56) References Cited

U.S. PATENT DOCUMENTS

| | | | |
|---|---|---|---|
| 2013/0250388 A1* | 9/2013 | Nozaki | G02B 26/101 |
| | | | 359/214.1 |
| 2013/0335457 A1 | 12/2013 | Yano et al. | |
| 2016/0366377 A1 | 12/2016 | Lim et al. | |
| 2017/0237880 A1* | 8/2017 | Saracco | G03B 21/2033 |
| | | | 348/757 |
| 2019/0052853 A1* | 2/2019 | Yoshida | H04N 9/646 |

FOREIGN PATENT DOCUMENTS

| | | |
|---|---|---|
| JP | 2007-248936 A | 9/2007 |
| JP | 2009-210619 A | 9/2009 |
| JP | 2013-257477 A | 12/2013 |
| KR | 10-2013-0140564 A | 12/2013 |
| KR | 10-1647727 B1 | 8/2016 |
| TW | 201411587 A | 3/2014 |

* cited by examiner

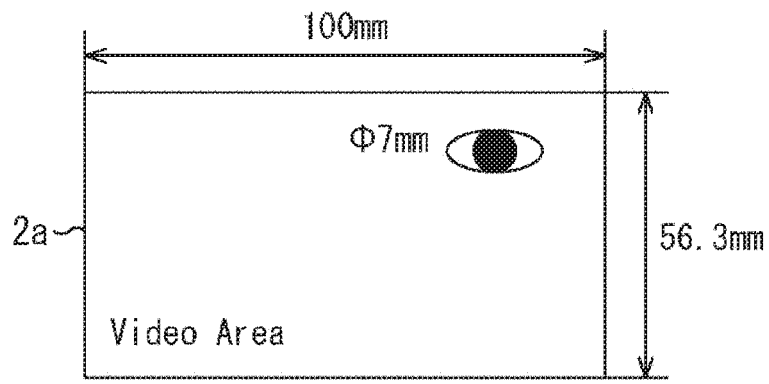
FIG. 15A
Horizontal 7mm / 100mm = 7%
Vertical   7mm / 56.3mm = 12.4%
FIG. 15B
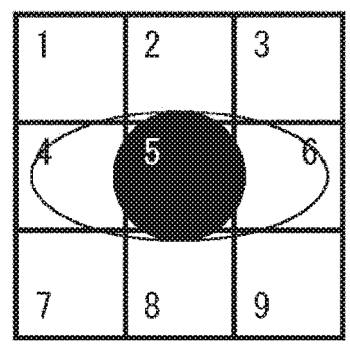

IMAGE PROCESSING APPARATUS, IMAGE PROCESSING METHOD, AND PROJECTION APPARATUS

CROSS REFERENCE TO RELATED APPLICATIONS

This application is a U.S. National Phase of International Patent Application No. PCT/JP2018/018233 filed on May 11, 2018, which claims priority benefit of Japanese Patent Application No. JP 2017-103293 filed in the Japan Patent Office on May 25, 2017. Each of the above-referenced applications is hereby incorporated herein by reference in its entirety.

TECHNICAL FIELD

The present technology relates to an image processing apparatus, an image processing method, and a projection apparatus, and in particular, an image processing apparatus, an image processing method, and a projection apparatus that can improve brightness of a projected image while satisfying a safety standard for laser products.

BACKGROUND ART

Some conventional projectors, for example, scan a screen by reciprocating a laser beam sinusoidally (for example, see Patent Document 1).

This type of projector causes a drive mirror, which reflects a laser beam, to be scanned by resonance operation, thereby irradiating each position on a screen with the laser beam reflected by the drive mirror.

With this arrangement, irradiation with the laser beam causes a spot of light, which is a spot-like light, to be projected on each position on the screen. In other words, an image is projected on the screen, with a plurality of spots of light each serving as a pixel.

CITATION LIST

Patent Document

Patent Document 1: Japanese Patent Application Laid-Open No. 2003-021800

SUMMARY OF THE INVENTION

Problems to be Solved by the Invention

Such a projector that performs scanning with a laser beam is subject to a restriction on laser power in order to satisfy the safety standard for laser products. Due to the restriction on laser power, brightness of a projected image is also restricted.

The present technology has been made in view of such a situation, and is intended to improve brightness of a projected image while satisfying the safety standard for laser products.

Solutions to Problems

An image processing apparatus according to one aspect of the present technology includes a saturation emphasis processing unit that determines, in accordance with saturation of an image, a first emphasis coefficient that emphasizes luminance of the image, and converts a luminance signal of the image on the basis of the determined first emphasis coefficient.

In an image processing method according to one aspect of the present technology, an image processing apparatus determines, in accordance with saturation of an image, an emphasis coefficient that emphasizes luminance of the image, and converts a luminance signal of the image on the basis of the determined emphasis coefficient.

A projection apparatus according to one aspect of the present technology includes a saturation emphasis processing unit that determines, in accordance with saturation of an input image, an emphasis coefficient that emphasizes luminance of the image, and converts a luminance signal of the image on the basis of the determined emphasis coefficient, a laser light source unit that outputs a laser beam in accordance with a pixel signal of the image obtained by converting the luminance signal, and a scanning unit that reflects the laser beam and performs scanning with the laser beam in a horizontal direction and a vertical direction.

In one aspect of the present technology, in accordance with saturation of an image, a first emphasis coefficient that emphasizes luminance of the image is determined, and a luminance signal of the image is converted on the basis of the determined first emphasis coefficient.

Note that the image processing apparatus according to one aspect of the present technology can be achieved by causing a computer to execute a program.

Furthermore, in order to achieve the image processing apparatus according to one aspect of the present technology, a program to be executed by a computer can be provided by being transmitted via a transmission medium or being recorded on a recording medium.

The image processing apparatus may be an independent apparatus, or may be an internal block constituting one apparatus.

Effects of the Invention

According to one aspect of the present technology, it is possible to improve brightness of a projected image while satisfying the safety standard for laser products.

Note that the effects described here are not necessarily restrictive, and the effects of the invention may be any of the effects described in the present disclosure.

BRIEF DESCRIPTION OF DRAWINGS

FIGS. 15A and 15B are diagrams for describing a relationship between an area of a projection image and an eye.

MODE FOR CARRYING OUT THE INVENTION

Figure 1:
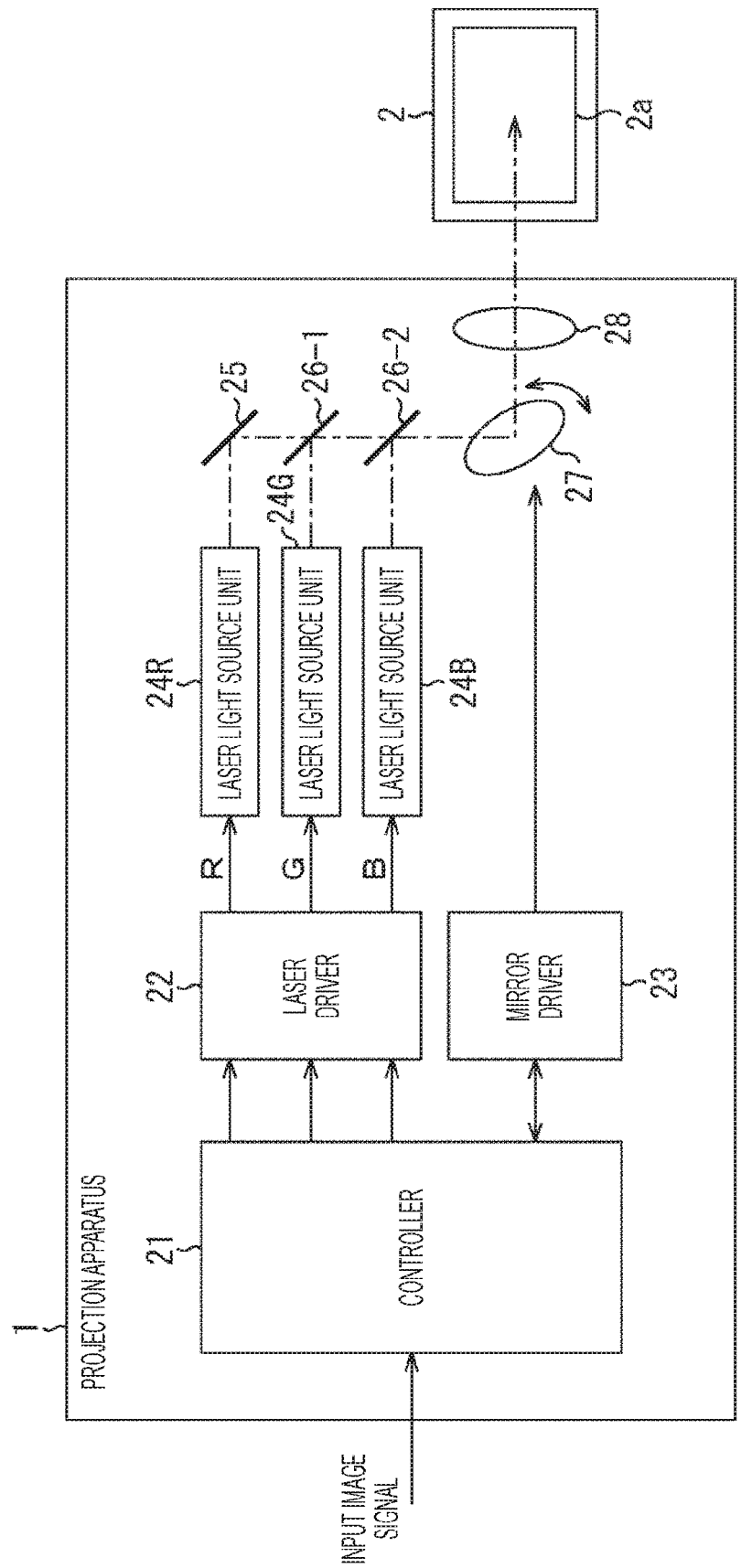
FIG. 1 is a block diagram illustrating a configuration example of a projection apparatus to which the present technology is applied.

A mode for carrying out the present technology (hereinafter referred to as an "embodiment") will be described below. Note that the description will be made in the order below.

1. Configuration example of projection apparatus
2. Raster scanning
3. General flow of signal processing
4. Flow of signal processing in projection apparatus 1
5. Detailed configuration of emphasis processing unit 61
6. Details of saturation emphasis processing unit 71
7. Details of area emphasis processing unit 72
8. Flowchart
9. Other configuration examples of projection apparatus
10. Configuration example of computer
11. Example of application to electronic equipment as projection module <1. Configuration Example of Projection Apparatus>

FIG. 1 is a block diagram illustrating a configuration example of a projection apparatus to which the present technology is applied.

This projection apparatus 1 is a laser beam scanning type projection apparatus (projector) that projects a projection image 2a onto a screen 2 by performing scanning with a laser beam as a light source. Note that the projection image 2a can be projected not only onto the screen 2 but also onto a wall surface, a flat surface of a predetermined object, or the like.

The projection apparatus 1 includes a controller 21, a laser driver 22, a mirror driver 23, laser light source units 24R, 24G, and 24B, a mirror 25, dichroic mirrors 26-1 and 26-2, a drive mirror 27, and an optical lens 28.

The controller 21 is supplied with image signals of the projection image 2a to be projected on the screen 2 as input image signals from another apparatus, for example, a personal computer.

The controller 21 generates pixel data for each color (red, green, and blue) of each pixel constituting the projection image 2a on the basis of input image signals supplied from another apparatus, and supplies the laser driver 22 with the pixel data in synchronization with a mirror synchronization signal acquired from the mirror driver 23. Note that the mirror synchronization signal is a signal for driving the mirror driver 23 in synchronization with the input image signals.

On the basis of the pixel data for each color supplied from the controller 21, the laser driver 22 generates drive signals in accordance with pixel values for each pixel of the projection image 2a, and supplies the drive signals to the laser light source units 24R, 24G, and 24B. Specifically, the laser driver 22 supplies a drive signal in accordance with red pixel data to the laser light source unit 24R, supplies a drive signal in accordance with green pixel data to the laser light source unit 24G, and supplies a drive signal in accordance with blue pixel data to the laser light source unit 24B.

To scan the screen 2 with a laser beam in a horizontal direction (left and right direction in the figure) and a vertical direction (up and down direction in the figure), the mirror driver 23 generates a horizontal scan signal and a vertical scan signal based on a resonance frequency of the drive mirror 27, and supplies the horizontal scan signal and the vertical scan signal to the drive mirror 27. Furthermore, the mirror driver 23 has a light receiving unit (not illustrated) that detects a part of the laser beam reflected by the drive mirror 27. Then, the mirror driver 23 adjusts the horizontal scan signal and the vertical scan signal on the basis of a result of detection by the light receiving unit, and feeds back, to the controller 21, a detection signal in accordance with the result of detection by the light receiving unit.

The laser light source units 24R, 24G, and 24B output laser beams of corresponding colors (light wavelengths) in accordance with the drive signals supplied from the laser driver 22. Specifically, the laser light source unit 24R outputs a red laser beam with a power in accordance with the red pixel data. The laser light source unit 24G outputs a green laser beam with a power in accordance with the green pixel data. The laser light source unit 24B outputs a blue laser beam with a power in accordance with the blue pixel data.

Note that the laser light source units 24R, 24G, and 24B are hereinafter collectively referred to simply as the "laser light source unit 24" in a case where it is not necessary to distinguish the laser light source units 24R, 24G, and 24B.

The mirror 25 reflects the red laser beam output from the laser light source unit 24R. The dichroic mirror 26-1 reflects the green laser beam output from the laser light source unit 24G and transmits the red laser beam reflected by the mirror 25. The dichroic mirror 26-2 reflects the blue laser beam output from the laser light source unit 24B, and transmits the red laser beam reflected by the mirror 25 and the green laser beam reflected by the dichroic mirror 26-1. Note that the mirror 25 and the dichroic mirrors 26-1 and 26-2 are combined and disposed such that optical axes of the laser beams output from the laser light source units 24R, 24G, and 24B are coaxial.

The drive mirror 27 is, for example, a minute mirror formed by a micro electro mechanical system (MEMS), and is driven in accordance with the horizontal scan signal and the vertical scan signal supplied from the mirror driver 23.

In other words, for example, the drive mirror 27 reflects the laser beam output from each of the laser light source units 24R, 24G, and 24B and performs scanning with the laser beam across the screen 2 in the horizontal direction and the vertical direction.

The optical lens 28 is disposed on an optical path of the laser beam traveling from the drive mirror 27 to the screen 2, and corrects the optical path of the laser beam.

Note that the projection apparatus 1 can adopt a configuration in which the laser driver 22 and the mirror driver 23 are integrated into the controller 21. Furthermore, the projection apparatus 1 may be configured such that the optical lens 28 is not disposed on the optical path of the laser beam.

Figure 2:
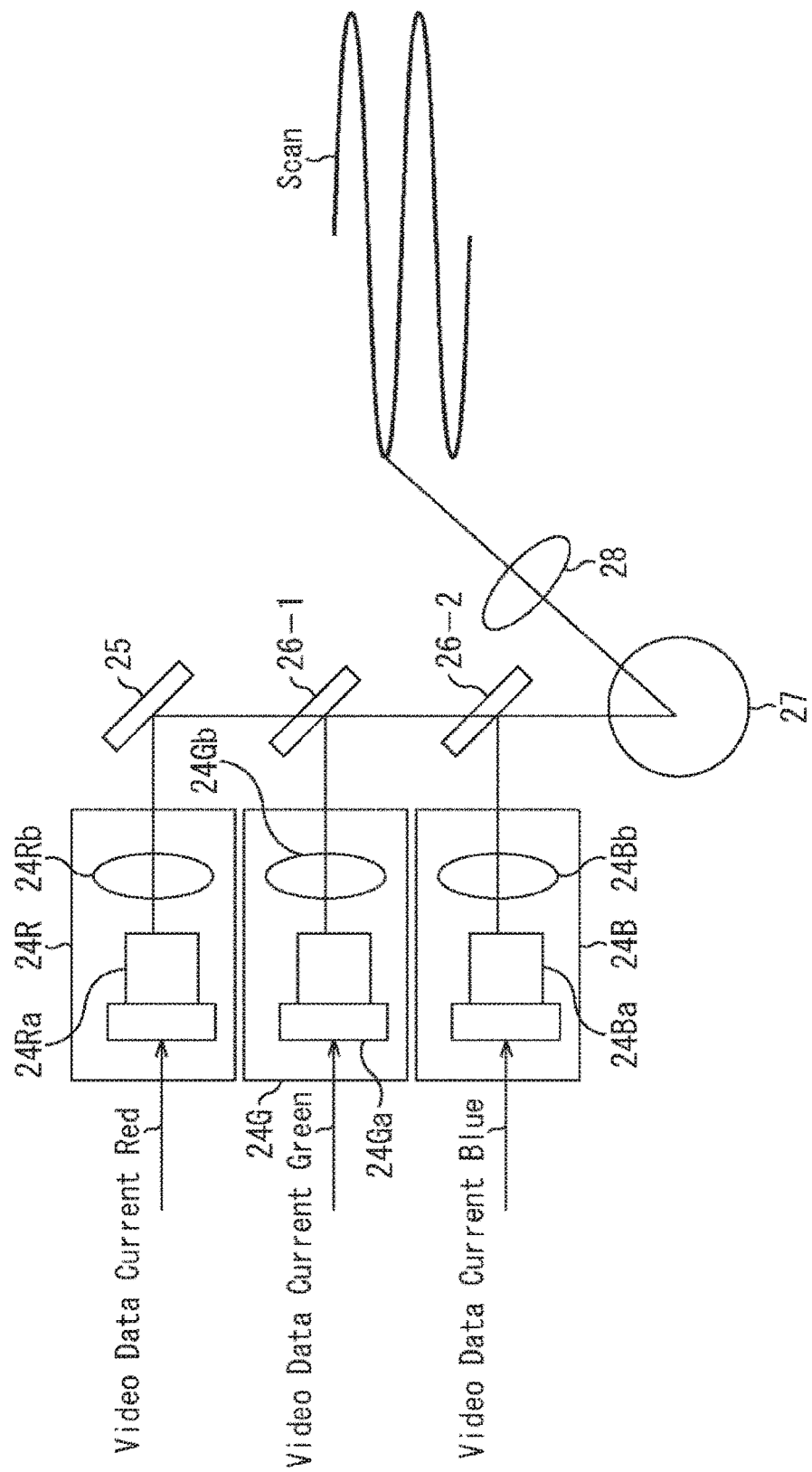
FIG. 2 is a diagram illustrating in more detail a configuration of a laser light source unit.

FIG. 2 is a diagram illustrating in more detail a configuration of the laser light source units 24R, 24G, and 24B.

The laser light source units 24R, 24G, and 24B respectively include laser beam generation units 24Ra, 24Ga, and 24Ba and collimator lenses 24Rb, 24Gb, and 24Bb, for wavelengths of R (red), G (green), and B (blue) respectively. In other words, the laser light source units 24R, 24G, and 24B respectively have the laser beam generation units 24Ra, 24Ga, and 24Ba that generate laser beams of wavelengths specific to the respective colors, and the collimator lenses 24Rb, 24Gb, and 24Bb that collimate and output the laser beams of the respective wavelengths. Note that the laser beam generation units 24Ra, 24Ga, and 24Ba and the collimator lenses 24Rb, 24Gb, and 24Bb are collectively referred to simply as the "laser beam generation unit 24a" and the "collimator lens 24b" respectively, in a case where it is not necessary to particularly distinguish the respective colors (wavelengths).

The laser beam generation unit 24Ra emits a red laser beam on the basis of a drive signal (Video Data Current Red) in accordance with the red pixel data. The collimator lens 24Rb appropriately adjusts an emission direction of the red laser beam emitted from the laser beam generation unit 24Ra, and then the red laser beam is reflected by the mirror 25 and enters the dichroic mirror 26-1.

The laser beam generation unit 24Ga emits a green laser beam on the basis of a drive signal (Video Data Current Green) in accordance with the green pixel data. The collimator lens 24Gb appropriately adjusts an emission direction of the green laser beam emitted from the laser beam generation unit 24Ga, and then the green laser beam is reflected by the dichroic mirror 26-1 and enters the dichroic mirror 26-2. Furthermore, the dichroic mirror 26-1 transmits the red laser beam that enters from the mirror 25, thereby allowing the red laser beam to enter the dichroic mirror 26-2.

The laser beam generation unit 24Ba emits a blue laser beam on the basis of a drive signal (Video Data Current Blue) in accordance with the blue pixel data. The collimator lens 24Bb appropriately adjusts an emission direction of the blue laser beam radiated from the laser beam generation unit 24Ba, and then the blue laser beam is reflected by the dichroic mirror 26-2 and enters the drive mirror 27. Furthermore, the dichroic mirror 26-2 transmits the red and green laser beams that enter from the dichroic mirror 26-1, thereby allowing the red and green laser beams to enter the drive mirror 27. As a result, the red, green, and blue (R, G, and B) laser beams from the dichroic mirror 26-2 enter the drive mirror 27 as a multiplexed beam.

The projection apparatus 1 drives the drive mirror 27 to perform scanning with the red, green, and blue laser beams, thereby projecting a two-dimensional projection image 2a on the screen 2. Examples of the laser beam scanning method by using the drive mirror 27 includes, for example, a method called "raster scanning" and a method called "Lissajous scanning". The projection apparatus 1 adopts, for example, raster scanning.

<2. Raster Scanning>

Raster scanning will be described with reference to FIG. 3.

Figure 3:
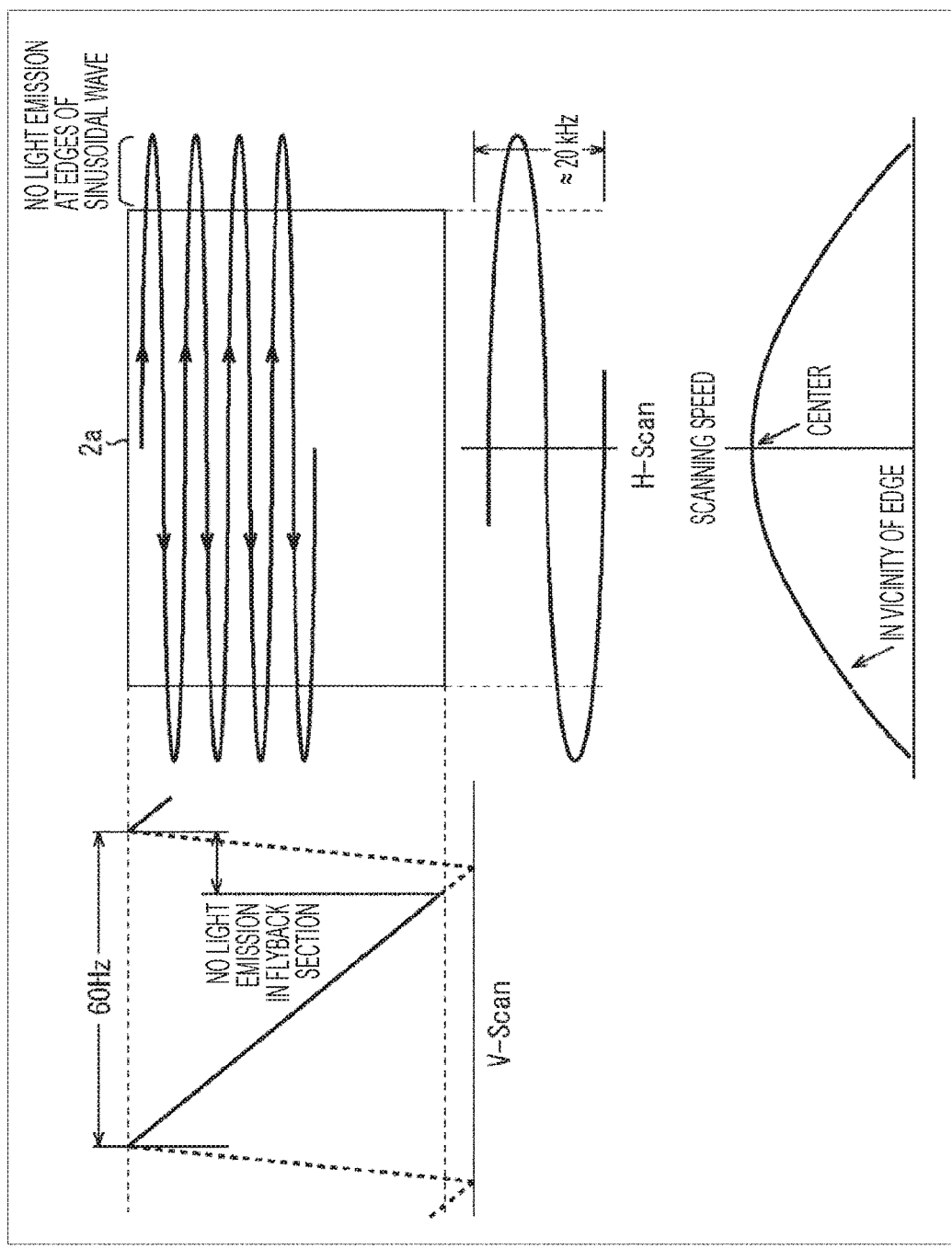
FIG. 3 is a diagram for describing raster scanning.

In FIG. 3, a scanning locus of the laser beam in raster scanning is illustrated on the projection image 2a, a horizontal scan signal H-Scan is illustrated below the projection image 2a, and a vertical scan signal V-Scan is illustrated to the left of the projection image 2a.

The horizontal scan signal H-Scan is, for example, a sinusoidal signal oscillating at about 20 kHz in accordance with the resonance frequency of the drive mirror 27, and a frequency of the horizontal scan signal H-Scan is half a horizontal synchronization frequency of the projection image 2a. The vertical scan signal V-Scan is, for example, a signal having a sawtooth waveform and oscillating at 60 Hz, which is a frequency in accordance with a frame period of the projection image 2a.

Note that the laser beam does not emit light in the scanning locus in the vicinity of both edges of the horizontal scan signal H-Scan. This allows turn portions of the scanning locus to be excluded from projection of the projection image 2a. Furthermore, the laser beam does not emit light in a section where the vertical scan signal V-Scan shows a waveform that rises substantially vertically, that is, in a flyback section in which the scanning locus of the laser beam shows a steep slope from a bottom edge (end position of the scanning) to a top edge (start position of the next scanning).

Driving the drive mirror 27 in accordance with the horizontal scan signal H-Scan and the vertical scan signal V-Scan as described above causes scanning with the laser beam to be performed along a scanning locus as illustrated on the projection image 2a. As illustrated, scanning with the laser beam is performed in both directions. The scanning direction of the laser beam is reversed in every horizontal scanning line, and it is therefore necessary to rearrange order of input image signals or change a data access direction for the input image signals in every scanning line.

Furthermore, as illustrated below the horizontal scan signal H-Scan in FIG. 3, a scanning speed of the laser beam in the horizontal direction increases at the center of the projection image 2a and decreases in the vicinity of edges of the projection image 2a. The scanning speed of the laser beam in the vertical direction is fixed regardless of the position in the projection image 2a. Note that, for the sake of simplicity, the entire projection image 2a may be referred to as the "screen" in the description below.

<3. General Flow of Signal Processing>

Figure 4:
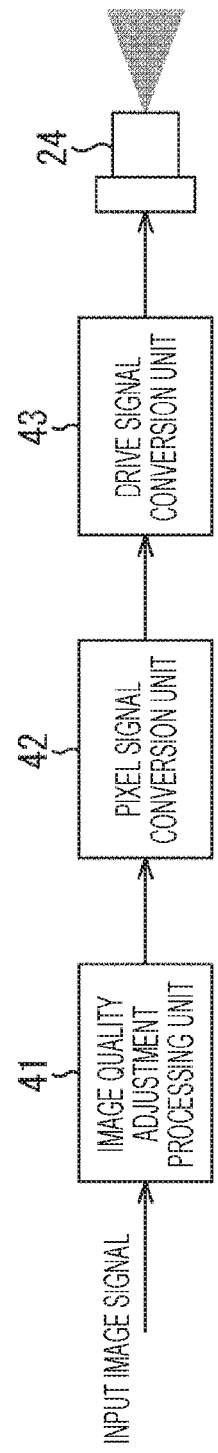
FIG. 4 is a block diagram for describing a general flow of signal processing.

FIG. 4 is a block diagram illustrating a general flow of signal processing in which input image signals are converted into drive signals to be input to the laser light source unit 24.

Input image signals supplied from another apparatus are converted into drive signals by undergoing predetermined processing in each of an image quality adjustment processing unit 41, a pixel signal conversion unit 42, and a drive signal conversion unit 43, and are supplied to the laser light source unit 24.

The image quality adjustment processing unit 41 executes, on the input image signals, general image quality adjustment processing such as contrast adjustment and sharpness adjustment, and supplies the processed image signals to the pixel signal conversion unit 42.

The input image signals are supplied, for example, as image signals in a YUV format. A signal in the YUV format is represented by a luminance signal Y and Cb(U) and Cr(V)

components, the components being two color-difference signals (Cb and Cr signals). The luminance signal Y has a value in a range of 0 to 1, and the Cb and Cr signals have values in a range of −0.5 to +0.5. The Cb and Cr signals are also conveniently referred to as the "U and V signals".

The pixel signal conversion unit 42 converts the image signals supplied from the image quality adjustment processing unit 41 into pixel signals for each pixel constituting the screen in accordance with a raster scanning trajectory. More specifically, the pixel signal conversion unit 42 converts the image signals in the YUV format supplied from the image quality adjustment processing unit 41 into image signals in an RGB format, thereby converting the image signals into pixel signals (pixel data), one for each of R, G, and B of each pixel constituting the screen in accordance with the raster scanning trajectory.

The drive signal conversion unit 43 converts the pixel signals supplied from the pixel signal conversion unit 42 into drive signals for each of R, G, and B, and supplies the drive signals to the laser light source unit 24.

When the pixel signal conversion unit 42 converts the image signals into pixel signals for each of R, G, and B in accordance with the raster scanning trajectory, laser power adjustment in accordance with the scanning speed is also performed.

Figure 5:
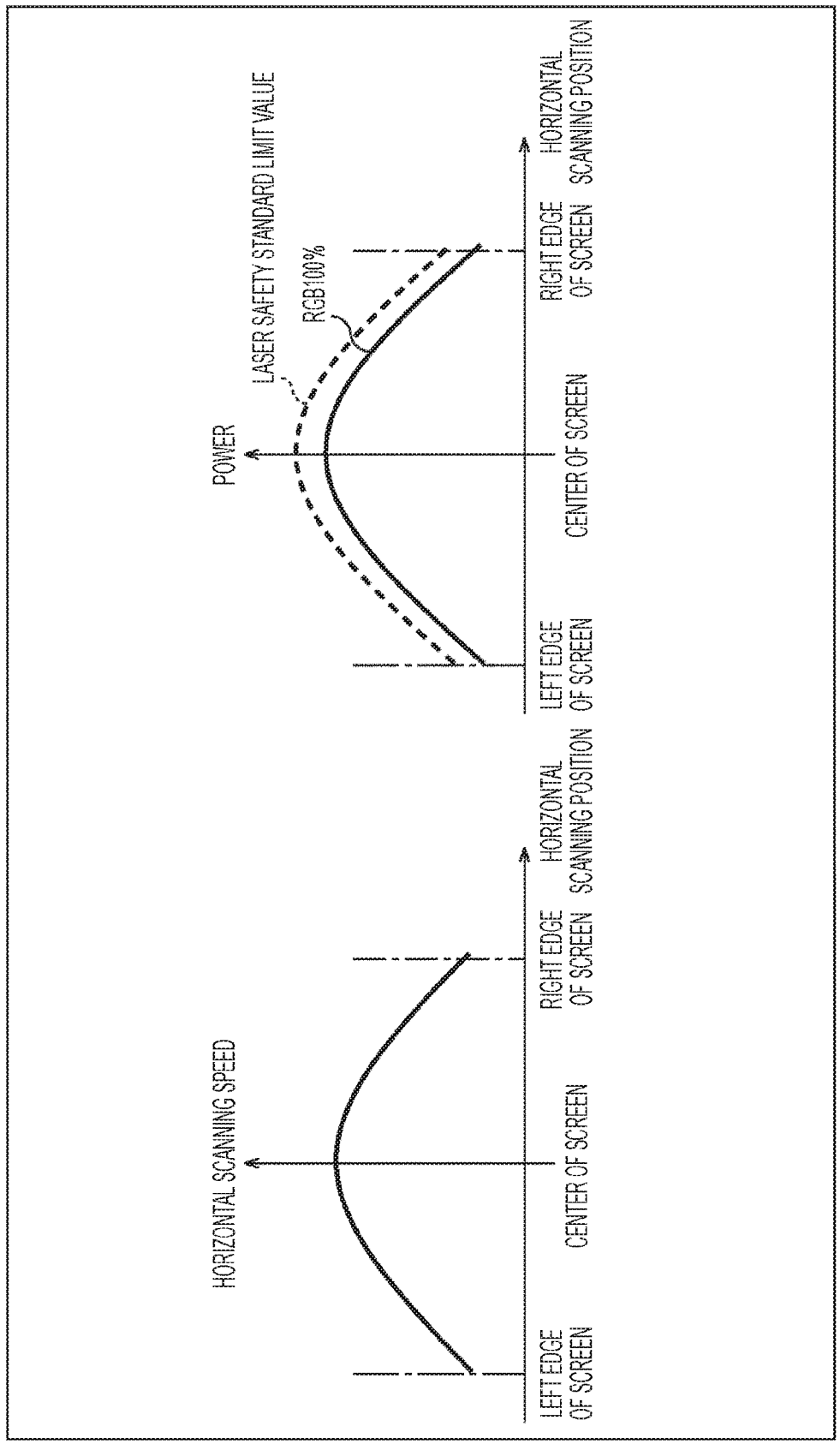
FIG. 5 is a diagram for describing a relationship between a scanning speed and laser power.

In other words, as illustrated in a graph on the left side of FIG. 5, the scanning speed of the laser beam in the horizontal direction increases at the center of the screen and decreases in the vicinity of edges of the screen. This difference in scanning speed causes accumulated power to vary in accordance with the position in the screen in a case where the power remains the same during scanning in the horizontal direction. That is to say, in a case where the power remains the same during horizontal scanning, the laser beam enters a human eye for a longer period of time in the vicinity of the screen edges where the scanning speed is low, resulting in more power of laser that enters the eye.

Thus, in order to satisfy a laser safety standard, as illustrated in a graph on the right side of FIG. 5, it is necessary to ensure safety by reducing the laser power in the vicinity of the screen edges where the scanning speed is low.

Figure 6:
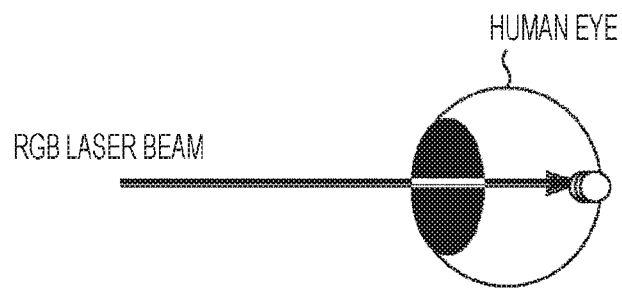
FIG. 6 is a diagram for describing a laser safety standard.

The laser safety standard imposes constraints on several conditions such as an accumulated power per unit time of a laser beam that enters a human eye and an instantaneous power so that safety can be maintained even when a collimated and highly focused laser beam enters a human eye as illustrated in FIG. 6.

The laser power becomes the largest in an image in which each of R light, G light, and B light is emitted at 100%, that is, in a white image. Accordingly, as illustrated in the graph on the right side of FIG. 5, the laser power is controlled within a laser safety standard limit value indicated by a broken line even in a case where the laser light source unit 24 emits white light with R, G, and B at 100%. A difference between the laser safety standard limit value and the power when R light, G light, and B light are emitted at 100% corresponds to a margin set in the projection apparatus 1. The laser safety standard serves as a restriction for projecting a bright image while constraining the power of a laser light source that can output a laser beam as a projection apparatus.

Figure 7:
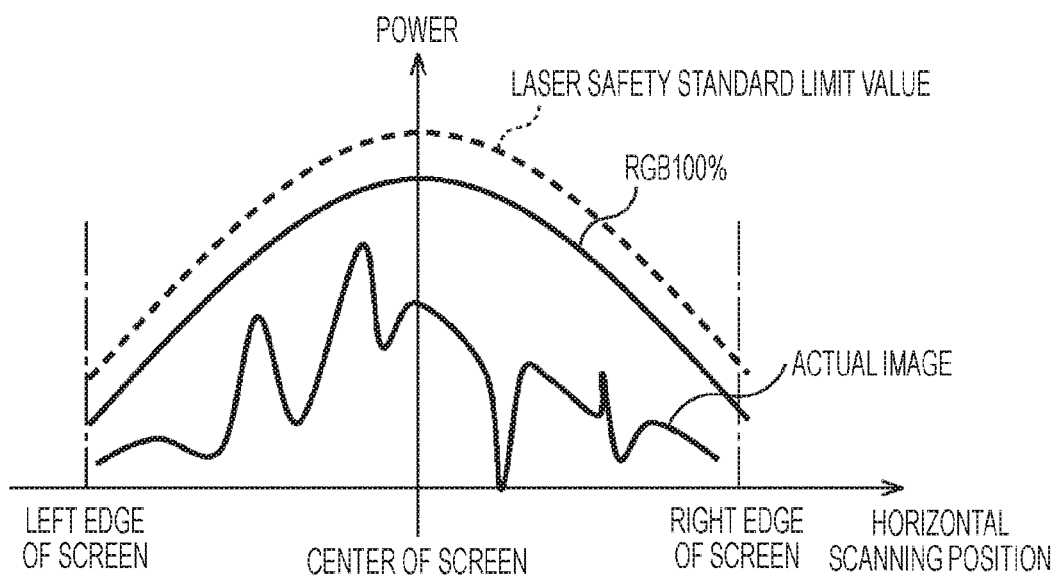
FIG. 7 is a diagram for describing laser power in a case where an actual image is projected.

On the other hand, in general, an image actually displayed by a projection apparatus often includes image signals (pixel signals) that cause brightness of about 30% just like a curve illustrated as an actual image in FIG. 7, and the projection apparatus operates at a power sufficiently smaller than the laser safety standard limit value.

Thus, the projection apparatus 1 analyzes a configuration of an image, specifically, hue of the image such as a single color or a pure color, and increases the laser power within the laser safety standard limit value in accordance with the analyzed hue of the image, thereby improving brightness of the image to be projected.

<4. Flow of Signal Processing in Projection Apparatus 1>

Figure 8:
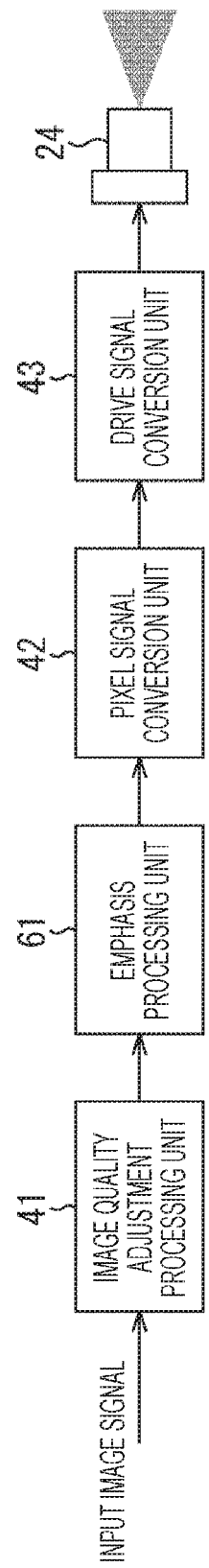
FIG. 8 is a block diagram for describing a flow of signal processing in the projection apparatus in FIG. 1.

FIG. 8 is a block diagram illustrating a flow of signal processing in which the projection apparatus 1 converts input image signals into drive signals.

Comparing the flow of processing performed by the projection apparatus 1 illustrated in FIG. 8 with the flow of general processing illustrated in FIG. 4, an emphasis processing unit 61 is newly disposed between the image quality adjustment processing unit 41 and the pixel signal conversion unit 42. Processing performed by the image quality adjustment processing unit 41, the pixel signal conversion unit 42, and the drive signal conversion unit 43 is similar to the processing described with reference to FIG. 4, and therefore the description thereof is omitted.

The emphasis processing unit 61 executes emphasis processing on image signals supplied from the image quality adjustment processing unit 41, in which a configuration of an image, specifically, hue of the image such as a single color or a pure color, is analyzed and the image signals are emphasized in accordance with the analyzed hue of the image. The emphasis processing unit 61 supplies the emphasized image signals to the pixel signal conversion unit 42.

The image quality adjustment processing unit 41, the pixel signal conversion unit 42, and the emphasis processing unit 61 in FIG. 8 correspond to a processing block executed by the controller 21 in FIG. 1, and the drive signal conversion unit 43 in FIG. 8 corresponds to a processing block executed by the laser driver 22 in FIG. 1.

<5. Detailed Configuration of Emphasis Processing Unit 61>

Figure 9:
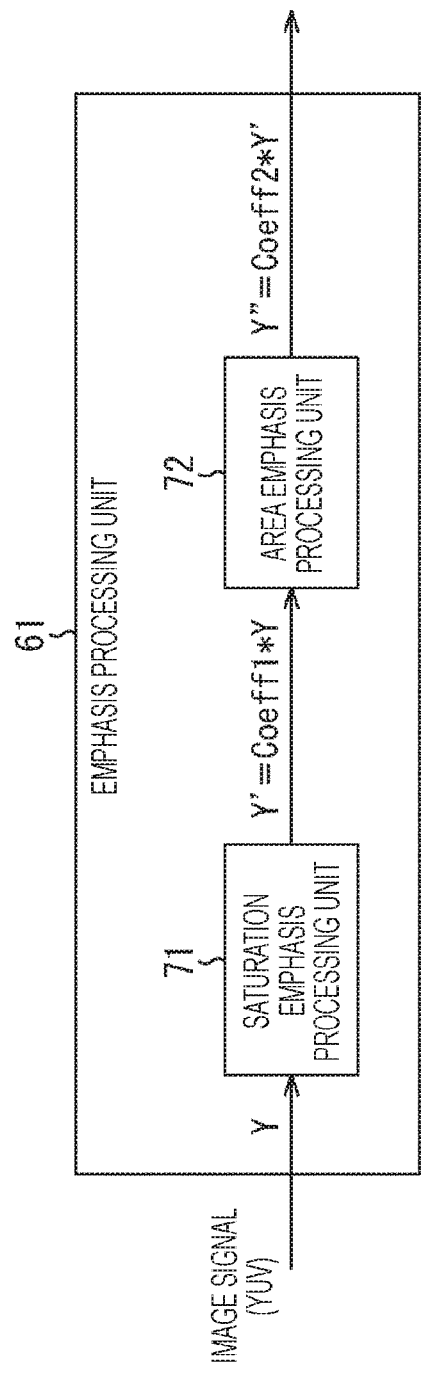
FIG. 9 is a block diagram illustrating a detailed configuration of an emphasis processing unit.

FIG. 9 illustrates a detailed configuration of the emphasis processing unit 61.

The emphasis processing unit 61 includes a saturation emphasis processing unit 71 and an area emphasis processing unit 72.

The saturation emphasis processing unit 71 is supplied with an image signal in the YUV format that has undergone general image quality adjustment processing such as contrast adjustment and sharpness adjustment in the image quality adjustment processing unit 41.

In accordance with saturation of an image supplied from the image quality adjustment processing unit 41, the saturation emphasis processing unit 71 determines an emphasis coefficient Coeff1 (first emphasis coefficient Coeff1) that emphasizes luminance of the image. Then, the saturation emphasis processing unit 71 emphasizes (converts) a luminance signal Y of the image on the basis of the determined emphasis coefficient Coeff1. Specifically, on the basis of the luminance signal Y of the image signal in the YUV format supplied from the image quality adjustment processing unit 41, the saturation emphasis processing unit 71 computes a luminance signal $Y'=Coeff1*Y$ by using the determined emphasis coefficient Coeff1 to calculate the emphasized luminance signal Y', and outputs the luminance signal Y' to the area emphasis processing unit 72.

The area emphasis processing unit 72 divides an image supplied from the saturation emphasis processing unit 71 into a plurality of areas, and determines an emphasis coefficient Coeff2 (second emphasis coefficient Coeff2) that emphasizes luminance of the image for each area. Then, the area emphasis processing unit 72 emphasizes (converts) the luminance signal Y' on the basis of the determined emphasis coefficient Coeff2. Specifically, on the basis of the luminance signal Y' of the image signal in the YUV format supplied from the saturation emphasis processing unit 71, the area emphasis processing unit 72 computes a luminance signal Y"=Coeff2*Y' by using the determined emphasis coefficient Coeff2 to calculate the emphasized luminance signal Y", and outputs the luminance signal Y" to the pixel signal conversion unit 42.

The pixel signal conversion unit 42 converts the luminance signal Y" and the two color-difference signals (Cb and Cr signals) into R, G, and B pixel signals, the luminance signal Y" being obtained by emphasizing the luminance signal Y by the saturation emphasis processing unit 71 and the area emphasis processing unit 72.

Details of processing performed by the saturation emphasis processing unit 71 and the area emphasis processing unit 72 will be further described below.

<6. Details of Saturation Emphasis Processing Unit 71>

First, details of the processing performed by the saturation emphasis processing unit 71 will be described.

The saturation emphasis processing unit 71 analyzes saturation of the image signals supplied from the image quality adjustment processing unit 41 for each pixel, and uses the predetermined emphasis coefficient Coeff1 to emphasize the luminance signal Y of a highly saturated pixel.

Figure 10:
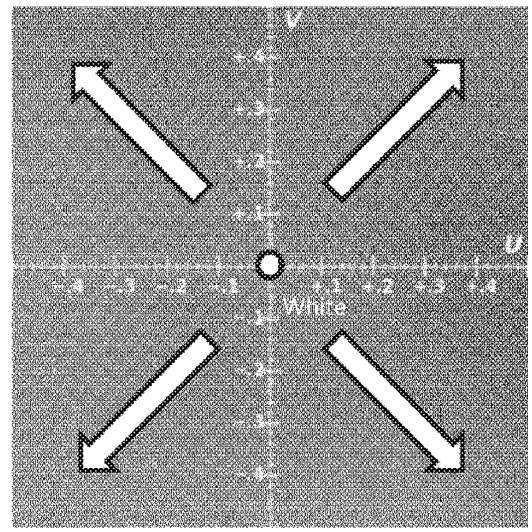
FIG. 10 is a diagram for describing a relationship between saturation and U and V signals.

Here, a highly saturated pixel means a pixel having hue that is not white but close to a pure color or a single color such as red, green, or blue. In UV color space, the more the values of the U and V signals are away from zero, the more the hue becomes highly saturated as illustrated in FIG. 10.

In a case of a highly saturated pixel, not all of red, green, and blue (R, G, and B) lasers emit light at nearly 100%. At least one of red, green, or blue laser operates at a lower power.

Figure 11:
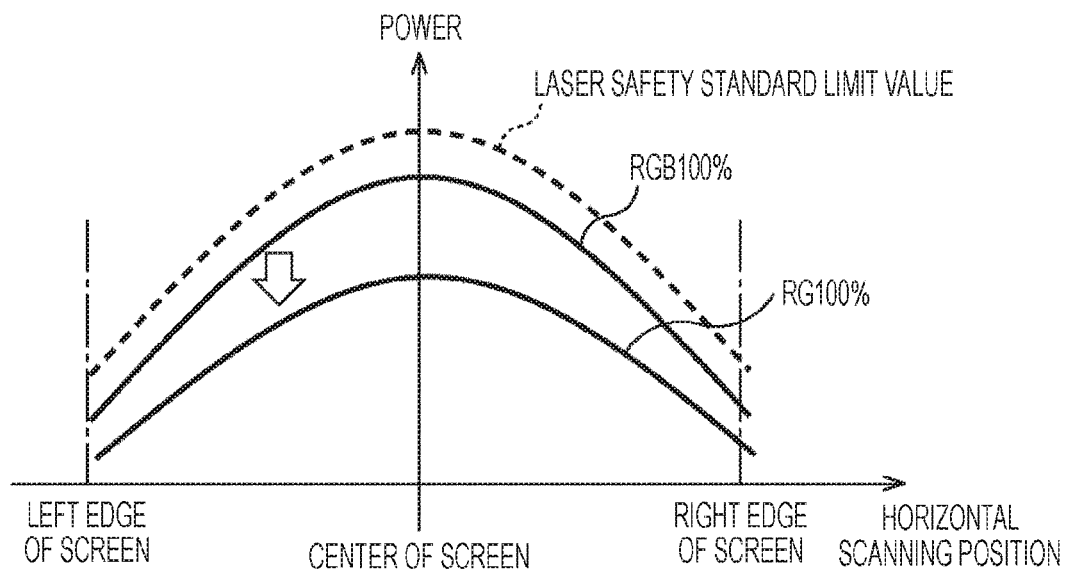
FIG. 11 is a diagram for describing a relationship between saturation and laser power.

For example, as illustrated in FIG. 11, in a case where the red and green (R and G) lasers emit light at 100% but the blue laser emits light at 0%, the power when R light and G light are emitted at 100%, which is the power of the output lasers, is sufficiently lower than the power when R light, G light, and B light are emitted at 100%. With the blue laser not emitting light, there is room to allow the red and green (R and G) lasers to emit light with a power of 100% or more.

In this way, the saturation emphasis processing unit 71 analyzes saturation of the image signals for each pixel, and converts the luminance signal Y into the emphasized luminance signal Y' for pixels having hue close to a pure color or a single color such as red, green, or blue.

More specifically, the saturation emphasis processing unit 71 sets each pixel constituting the screen as a pixel of interest, detects absolute values of the U and V signals, which are color-difference components of the pixel of interest, and determines either the absolute value of the U signal or the absolute value of the V signal, whichever is larger, as a variable ΔUV for calculating the emphasis coefficient Coeff1.

Then, the saturation emphasis processing unit 71 substitutes the determined variable ΔUV into a function $f(\Delta UV)$ that defines a correspondence relationship between the variable ΔUV and the emphasis coefficient Coeff1, to determine (calculate) the emphasis coefficient Coeff1 in accordance with saturation of the pixel of interest. Then, the saturation emphasis processing unit 71 multiplies the luminance signal Y of the pixel of interest by the determined emphasis coefficient Coeff1 to calculate the emphasized luminance signal Y'.

Figure 12B:
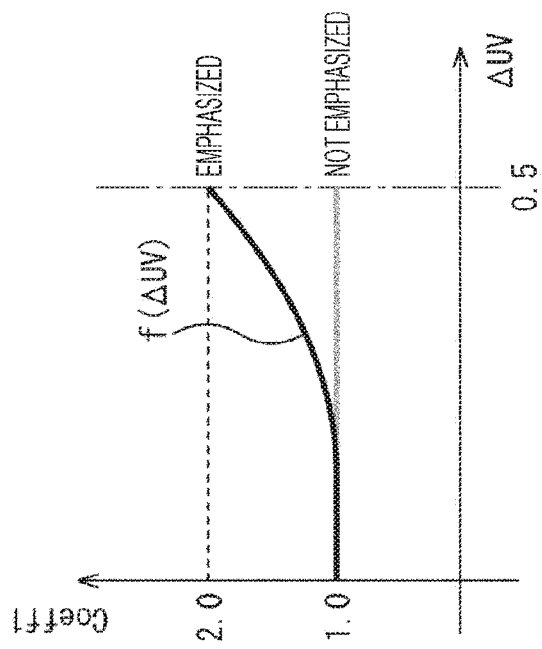
FIGS. 12A and 12B are diagrams for describing a correspondence relationship between a variable ΔUV and an emphasis coefficient Coeff1.
Figure 12A:
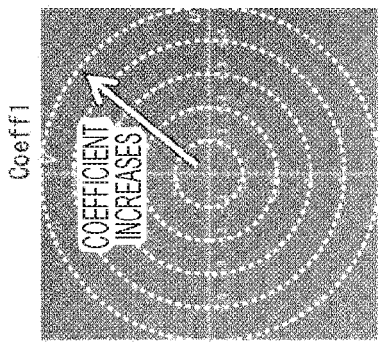

FIG. 12A illustrates an example of the function $f(\Delta UV)$ that defines the correspondence relationship between the variable ΔUV and the emphasis coefficient Coeff1.

Since the U and V signals both have values in a range of −0.5 to +0.5, the absolute values of the U and V signals are in a range of 0 to 0.5. In the function $f(\Delta UV)$, the emphasis coefficient Coeff1 increases as the variable ΔUV is closer to 0.5. When the variable ΔUV is 0.5, the emphasis coefficient Coeff1 is 2.0. In FIG. 12A, the emphasis coefficient Coeff1 equivalent to the power when R light, G light, and B light are emitted at 100% is, for example, 3.0. Since the function $f(\Delta UV)$ is defined such that the emphasis coefficient Coeff1 is set in a range that does not exceed 2.0, which is smaller than 3.0, the luminance signal Y is emphasized within the laser safety standard limit value.

FIG. 12B illustrates a concept of the emphasis coefficient Coeff1 in accordance with the variable ΔUV, and indicates that the emphasis coefficient Coeff1 is set larger as a distance from the origin (center) in the UV color space increases.

Note that, as can be seen from FIGS. 10 and 11, the emphasis coefficient Coeff1 can be set to a larger value as the hue is closer to a single color. Thus, the saturation emphasis processing unit 71 can also adopt a method in which red, green, and blue (R, G, and B) colors are analyzed in more detail and the emphasis coefficient Coeff1 is determined on the basis of R, G, and B values of the image.

Specifically, first, the saturation emphasis processing unit 71 converts an image signal in the YUV format into an image signal in the RGB format (hereinafter also referred to as "R, G, and B signals"). For example, according to the ITU-R BT.601 and ITU-R BT.709 standards, an image signal in the YUV format can be converted into an image signal in the RGB format by using conversion equations described below.

$$R = Y + 1.402 * Cr$$

$$G = Y - 0.344136 * Cb - 0.714136 * Cr$$

$$B = Y + 1.772 * Cb$$

Next, the saturation emphasis processing unit 71 normalizes the image signal in the RGB format with maxRGB, which is a maximum value among values that R, G, and B signals may have. In other words, the saturation emphasis processing unit 71 sets each pixel constituting the screen as a pixel of interest, and uses the equations described below to calculate Rnrm, Gnrm, and Bnrm, which are normalized R, B, and G signals obtained on the basis of the R, B, and G signals of the pixel of interest.

$$Rnrm = R / maxRGB$$

$$Gnrm = G / maxRGB$$

$$Bnrm = B / maxRGB$$

Here, for example, in a case where the image signal in the RGB format is a signal represented by 8 bits, maxRGB, which is the maximum value among the values that the R, G, and B signals may have, is 255.

Then, as expressed by the equation below, the saturation emphasis processing unit 71 determines (calculates) the margin Mg by multiplying Rnrm, Gnrm, and Bnrm, which are the normalized R, B, and G signals of the pixel of interest, by power coefficients Cr, Cg, and Cb for R, G, and B respectively, and then subtracting the obtained values from 1. The power coefficients Cr, Cg, and Cb respectively correspond to power ratios of the laser light source units 24R, 24G, and 24B when the laser light source unit 24 displays white as an image.

$$Mg=1-(Rnrm*Cr+Gnrm*Cg+Bnrm*Cb)$$

Finally, the saturation emphasis processing unit 71 determines (calculates) the emphasis coefficient Coeff1 in accordance with the saturation of the pixel of interest by substituting the determined margin Mg into a function $f(Mg)$ that defines a correspondence relationship between the margin Mg and the emphasis coefficient Coeff1. Then, the saturation emphasis processing unit 71 multiplies the luminance signal Y of the pixel of interest by the determined emphasis coefficient Coeff1 to calculate the emphasized luminance signal Y'.

Figure 13A:
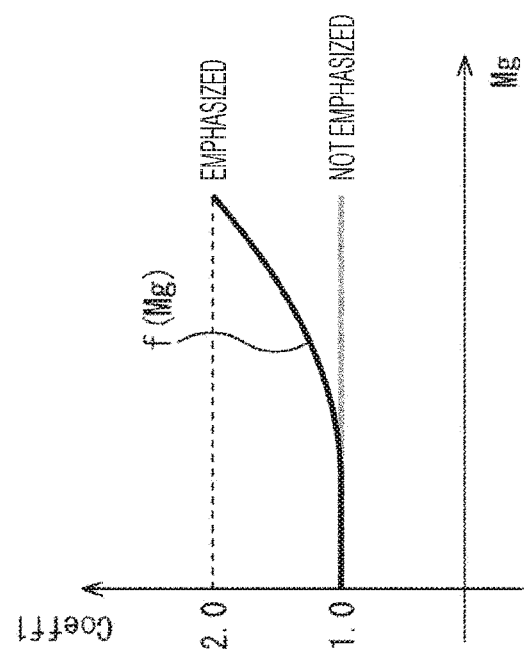
FIGS. 13A and 13B are diagrams for describing a correspondence relationship between a margin Mg and an emphasis coefficient Coeff1.

FIG. 13A illustrates an example of the function $f(Mg)$ that defines the correspondence relationship between the margin Mg and the emphasis coefficient Coeff1.

In the function $f(Mg)$, the emphasis coefficient Coeff1 increases as the margin Mg, which is a value computed by using Rnrm, Gnrm, and Bnrm and the power coefficients Cr, Cg, and Cb, increases. The emphasis coefficient Coeff1 equivalent to the power when R light, G light, and B light are emitted at 100% is, for example, 3.0. Since the function $f(Mg)$ is defined such that the emphasis coefficient Coeff1 is set in a range that does not exceed 2.0, which is smaller than 3.0, the luminance signal Y is emphasized within the laser safety standard limit value.

Figure 13B:
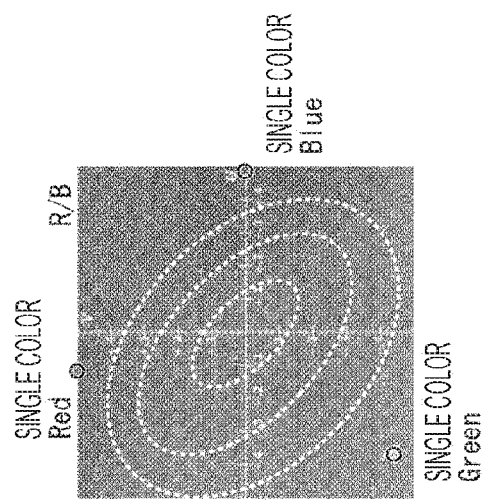

FIG. 13B illustrates a concept of the emphasis coefficient Coeff1 in accordance with the margin Mg, and indicates that the emphasis coefficient Coeff1 is set larger as a distance from the origin (center) in the UV color space increases.

The saturation emphasis processing unit 71 executes either emphasis processing based on U and V values, in which the emphasis coefficient Coeff1 in accordance with the variable ΔUV is determined and the luminance signal Y' is calculated, or emphasis processing based on the R, G, and B values, in which the emphasis coefficient Coeff1 in accordance with the margin Mg computed from the R, G, and B values is determined and the luminance signal Y' is calculated. The saturation emphasis processing unit 71 subsequently outputs the calculated luminance signal Y'.

Note that whether to execute the emphasis processing based on the U and V values or the emphasis processing based on the R, G, and B values can be determined, for example, on a setting screen or the like before an input image signal is supplied.

Figure 14:
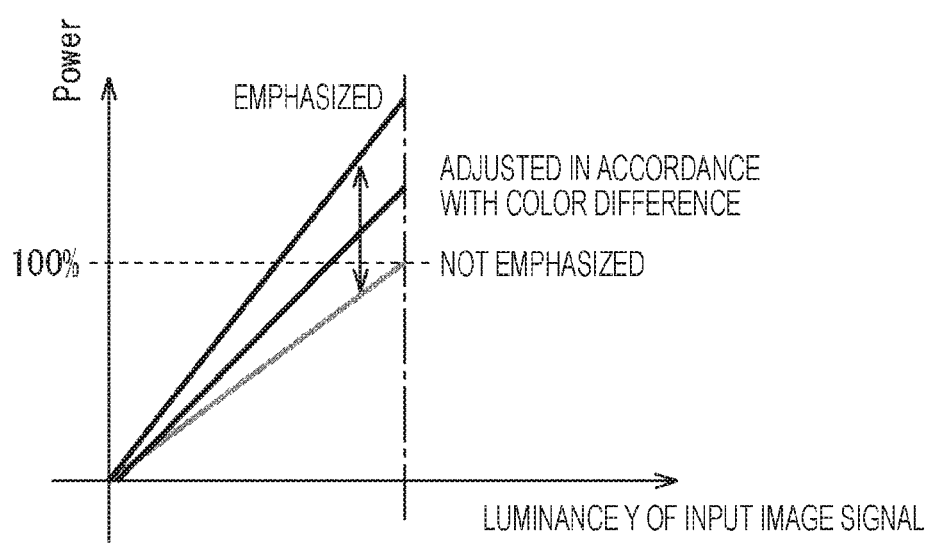
FIG. 14 is a diagram for describing processing performed by a saturation emphasis processing unit.

As described above, the processing performed by the saturation emphasis processing unit 71 analyzes the color-difference of the input image signals for each pixel. This allows at least one of R light, G light, or B light to be emitted at more than 100% of a normal time as illustrated in FIG. 14. With this arrangement, it is possible to improve brightness of a projected image while satisfying the safety standard for laser products.

<7. Details of Area Emphasis Processing Unit 72>

Next, details of the processing performed by the area emphasis processing unit 72 will be described.

There are cases where the projection image 2*a* projected onto the screen 2 by the projection apparatus 1 is an image in which light is brightly emitted only in small areas. An image in which light is brightly emitted only in small areas is, for example, an image of the universe, a starry sky, or the like. In such an image, the areas in which each of R light, G light, and B light is emitted at 100% are extremely narrow, and there is room to increase the power of emitting light because, in a case where a laser safety standard restricts a total accumulated value for a human eye, the total accumulated value of such an image is sufficiently lower than the laser safety standard.

Thus, the area emphasis processing unit 72 divides a screen into a plurality of areas, determines an emphasis coefficient Coeff2 of each area in consideration of an accumulated power value for a human eye, and uses the determined emphasis coefficient Coeff2 to convert a luminance signal Y' into a luminance signal Y".

There is no restriction on the number of the plurality of areas into which the screen is divided, and the screen can be divided into an optional number. However, taking into consideration that an eye is disposed randomly in a projection area, the number of areas into which the screen is divided is set such that the size of each of the plurality of divided areas is smaller than the size of a pupil of a human eye. The number of areas into which the screen is divided can be determined by a user on the setting screen or the like.

For example, as illustrated in FIG. 15A, in a case where an aspect ratio of the projection image 2*a* is 16:9, a distance from the projection apparatus 1 to the screen 2 is 100 mm, and a throw ratio (=projection distance/horizontal angle of view), which is a ratio between a projection distance and a horizontal angle of view, is 1.0, the angle of view of the projection image 2*a* is 100 mm×56.3 mm, and a human eye, which is about 7 mm in diameter, corresponds to 7% of the horizontal angle of view in size and 12.4% of a vertical angle of view in size.

Then, in a case where the size of each of the divided areas and the size of a pupil of a human eye are in a relationship as illustrated in FIG. 15B, areas 1 to 9 constituting nine (3×3) areas have an area size larger than the size of a pupil of a human eye.

In a case of determining the emphasis coefficient Coeff2 of a predetermined area of interest among the plurality of divided areas, the area emphasis processing unit 72 calculates a total laser power value Area$_{avgTTL}$ in an area of a size larger than the size of a pupil of a human eye, the area being obtained by combining the area of interest and its neighboring areas.

For example, in a case of determining the emphasis coefficient Coeff2 in the area 5 with the area 5 as the area of interest, the area emphasis processing unit 72 uses the Equation (1) below to calculate the total laser power value Area$_{avgTTL}$ in the entire nine (3×3) areas centered on the area 5.

[Mathematical Formula 1]

$$\text{Area}_{avgTTL} = \text{Area}_{avg1} + \text{Area}_{avg2} + \text{Area}_{avg4} + \cdots + \text{Area}_{avg9} \quad (1)$$

$$\text{Area}_{avg} = \frac{\left(C_r \sum \overline{R} + C_g \sum \overline{G} + C_b \sum \overline{B}\right)}{\text{Area}_{ttl\_pixel}} \quad (2)$$

According to Equation (1), the total laser power value (total accumulated value) Area$_{avgTTL}$ of the entire nine areas is obtained by adding average laser power values Area$_{avg1}$ to Area$_{avg9}$ in the areas 1 to 9.

Each of the average laser power values Area$_{avg1}$ to Area$_{avg9}$ in the areas 1 to 9 in Equation (1) is calculated by using Equation (2). Equation (2) represents that each of the average laser power values is obtained by respectively multiplying sums of signals of all pixels in the area for R, G, and B respectively by the power coefficients Cr, Cg, and Cb for R, G, and B respectively, adding all the multiplication results, and dividing the total by the number of pixels $\text{Area}_{tt1\_pixel}$ in the area.

As described above, the area for calculating the accumulated power value is determined in relation to the size of a pupil of a human eye (about 7 mm in diameter).

The area emphasis processing unit 72 determines whether the total laser power value $\text{Area}_{avgTTL}$ in the 3×3 neighboring areas centered on the area of interest (area 5) calculated by using Equation (1) is smaller than a threshold Th determined on the basis of the laser safety standard.

Figure 16:
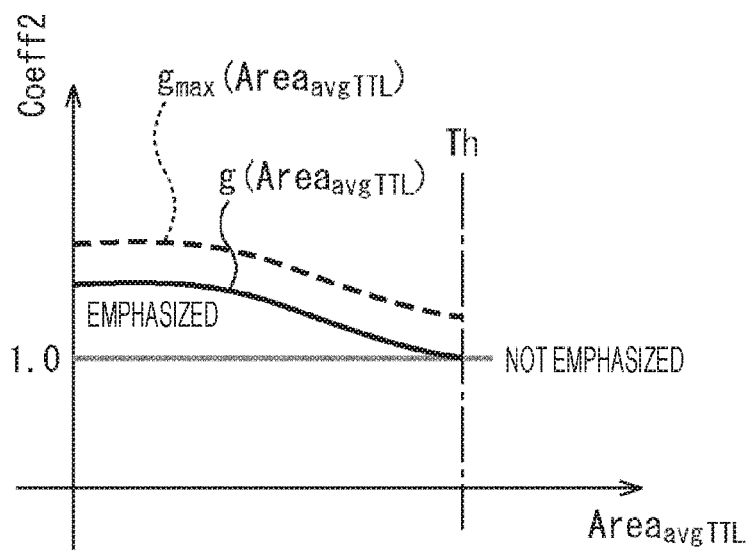
FIG. 16 is a diagram for describing a correspondence relationship between a total laser power value $Area_{avgTTL}$ and an emphasis coefficient Coeff2.

In a case where it is determined that the total laser power value $\text{Area}_{avgTTL}$ in the 3×3 neighboring areas centered on the area of interest is smaller than the threshold Th, the area emphasis processing unit 72 determines the emphasis coefficient Coeff2 in accordance with the accumulated power value in the area of interest by substituting the calculated total laser power value $\text{Area}_{avgTTL}$ into a function $g(\text{Area}_{avgTTL})$ that defines a correspondence relationship between the total laser power value $\text{Area}_{avgTTL}$ and the emphasis coefficient Coeff2 as illustrated in FIG. 16. Then, the area emphasis processing unit 72 multiplies the luminance signal Y' of each pixel in the area of interest by the determined emphasis coefficient Coeff2 to calculate the emphasized luminance signal Y" of each pixel in the area of interest.

A function $g_{max}(\text{Area}_{avgTTL})$ indicated by a broken line in FIG. 16 represents upper limit values of the emphasis coefficient Coeff2 within the laser safety standard. Accordingly, the function $g(\text{Area}_{avgTTL})$ that defines the correspondence relationship between the total laser power value $\text{Area}_{avgTTL}$ and the emphasis coefficient Coeff2 is set such that the luminance signal Y' is emphasized within the laser safety standard limit value.

Figure 17:
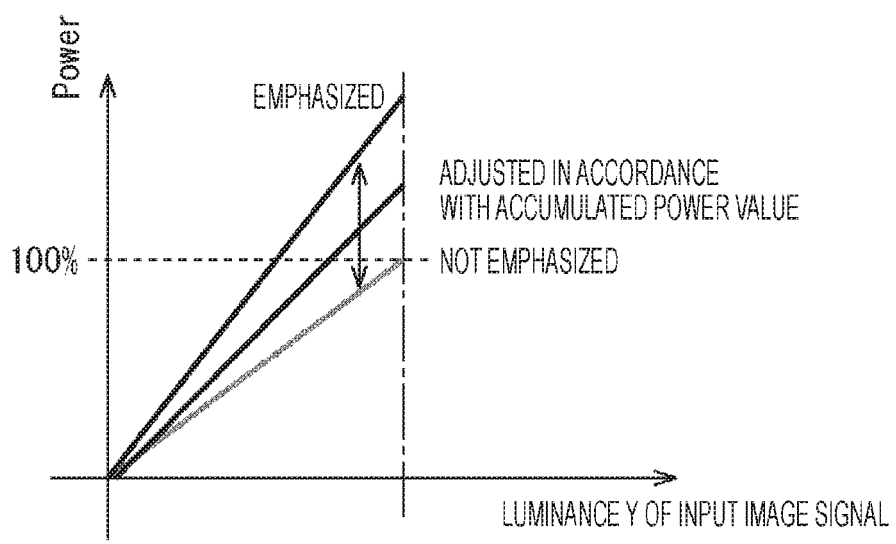
FIG. 17 is a diagram for describing processing performed by an area emphasis processing unit.

As described above, the processing performed by the area emphasis processing unit 72 calculates an accumulated laser power value corresponding to the input image signals for each area of a predetermined size. This allows at least one of R light, G light, or B light to be emitted at more than 100% of a normal time as illustrated in FIG. 17. With this arrangement, it is possible to improve brightness of a projected image while satisfying the safety standard for laser products.

<8. Flowchart>

Figure 18:
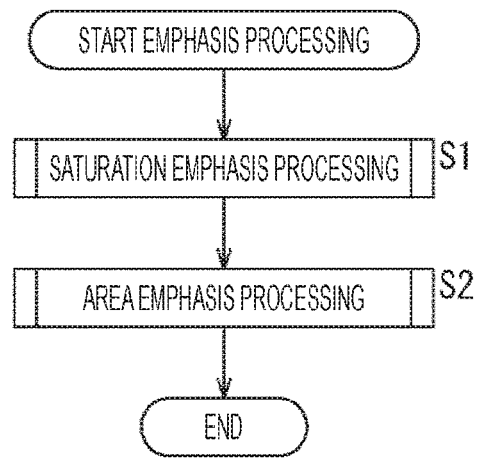
FIG. 18 is a flowchart for describing emphasis processing.

Next, emphasis processing executed by the emphasis processing unit 61 of the projection apparatus 1 will be described with reference to a flowchart in FIG. 18. This processing is started, for example, when an image signal in the YUV format is supplied to (the saturation emphasis processing unit 71 of) the emphasis processing unit 61.

First, in step S1, the saturation emphasis processing unit 71 executes saturation emphasis processing to emphasize a luminance signal Y by using the emphasis coefficient Coeff1 in accordance with saturation of an image supplied from the image quality adjustment processing unit 41. Details of the saturation emphasis processing will be described later with reference to FIGS. 19 and 20. The saturation emphasis processing converts the luminance signal Y of each pixel of the image supplied from the image quality adjustment processing unit 41 into a luminance signal Y'=Coeff1*Y, and outputs the luminance signal Y' to the area emphasis processing unit 72.

In step S2, the area emphasis processing unit 72 divides the image supplied from the saturation emphasis processing unit 71 into a plurality of areas, and executes area emphasis processing to emphasize the luminance signal Y' by using the emphasis coefficient Coeff2 for each area. Details of the area emphasis processing will be described later with reference to FIG. 21. The area emphasis processing converts the luminance signal Y' of each pixel of the image supplied from the saturation emphasis processing unit 71 into a luminance signal Y"=Coeff2*Y', and outputs the luminance signal Y" to the pixel signal conversion unit 42.

Figure 19:
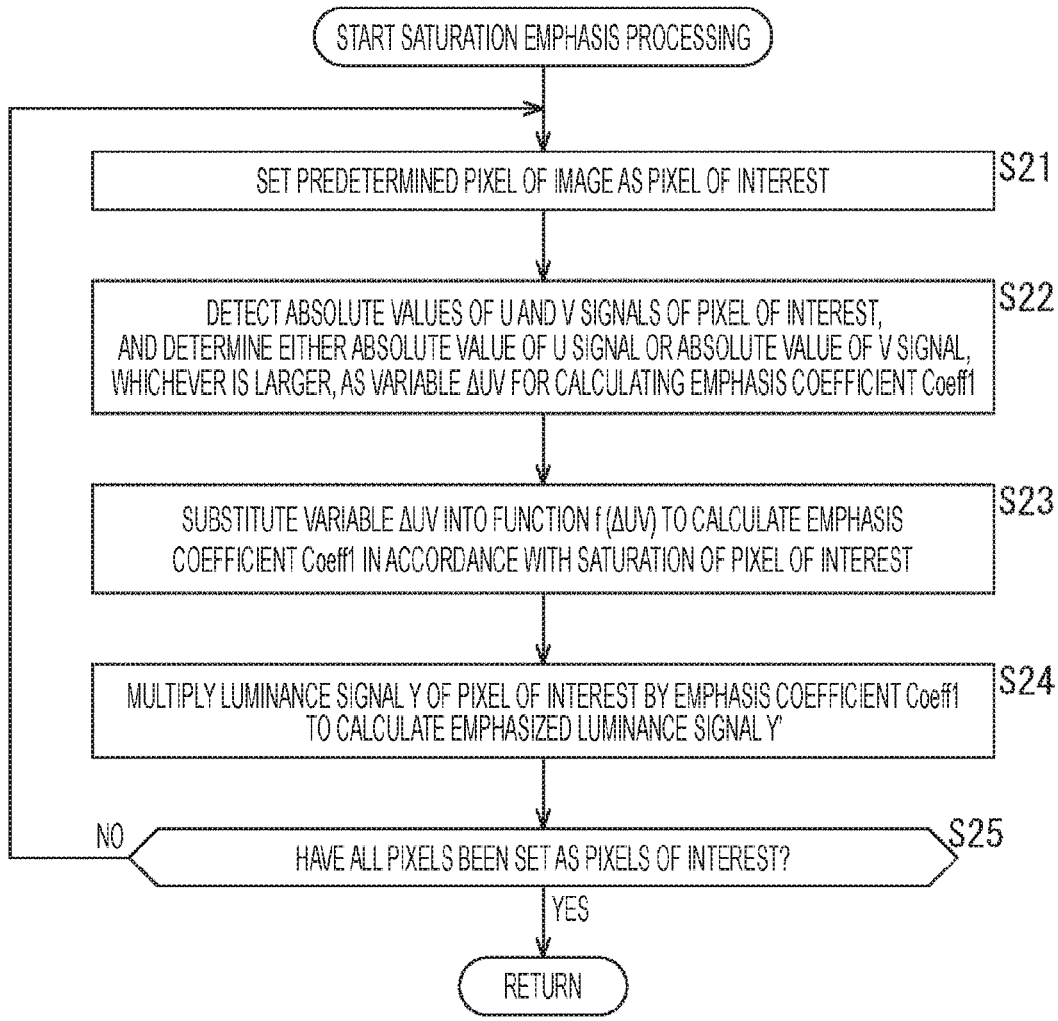
FIG. 19 is a flowchart for describing saturation emphasis processing.

FIG. 19 is a flowchart for describing details of the saturation emphasis processing in step S1, and is a flowchart of the saturation emphasis processing in a case where the emphasis coefficient Coeff1 is calculated on the basis of U and V values of a pixel.

In the flowchart in FIG. 19, first, in step S21, the saturation emphasis processing unit 71 sets a predetermined pixel of the image supplied from the image quality adjustment processing unit 41 as a pixel of interest.

In step S22, the saturation emphasis processing unit 71 detects absolute values of the U and V signals of the pixel of interest, and determines either the absolute value of the U signal or the absolute value of the V signal, whichever is larger, as a variable ΔUV for calculating the emphasis coefficient Coeff1.

In step S23, the saturation emphasis processing unit 71 substitutes the determined variable ΔUV into the function ƒ(ΔUV) that defines the correspondence relationship between the variable ΔUV and the emphasis coefficient Coeff1, to calculate (determine) the emphasis coefficient Coeff1 in accordance with saturation of the pixel of interest.

In step S24, the saturation emphasis processing unit 71 multiplies the luminance signal Y of the pixel of interest by the calculated emphasis coefficient Coeff1 to calculate the emphasized luminance signal Y'. The calculated luminance signal Y' is supplied to the area emphasis processing unit 72 together with the U and V signals.

In step S25, it is determined whether the saturation emphasis processing unit 71 has set all the pixels of the image supplied from the image quality adjustment processing unit 41 as pixels of interest.

In a case where it is determined in step S25 that the saturation emphasis processing unit 71 has not set all the pixels as pixels of interest, the processing returns to step S21. With this arrangement, the processing in steps S21 to S25 described above is repeated. In other words, a predetermined pixel not yet set as a pixel of interest is set as a pixel of interest, the emphasis coefficient Coeff1 in accordance with saturation of the pixel of interest is calculated, and the luminance signal Y' emphasized by the emphasis coefficient Coeff1 is calculated.

On the other hand, in a case where it is determined in step S25 that all the pixels have been set as pixels of interest, the saturation emphasis processing in FIG. 19 ends.

Figure 20:
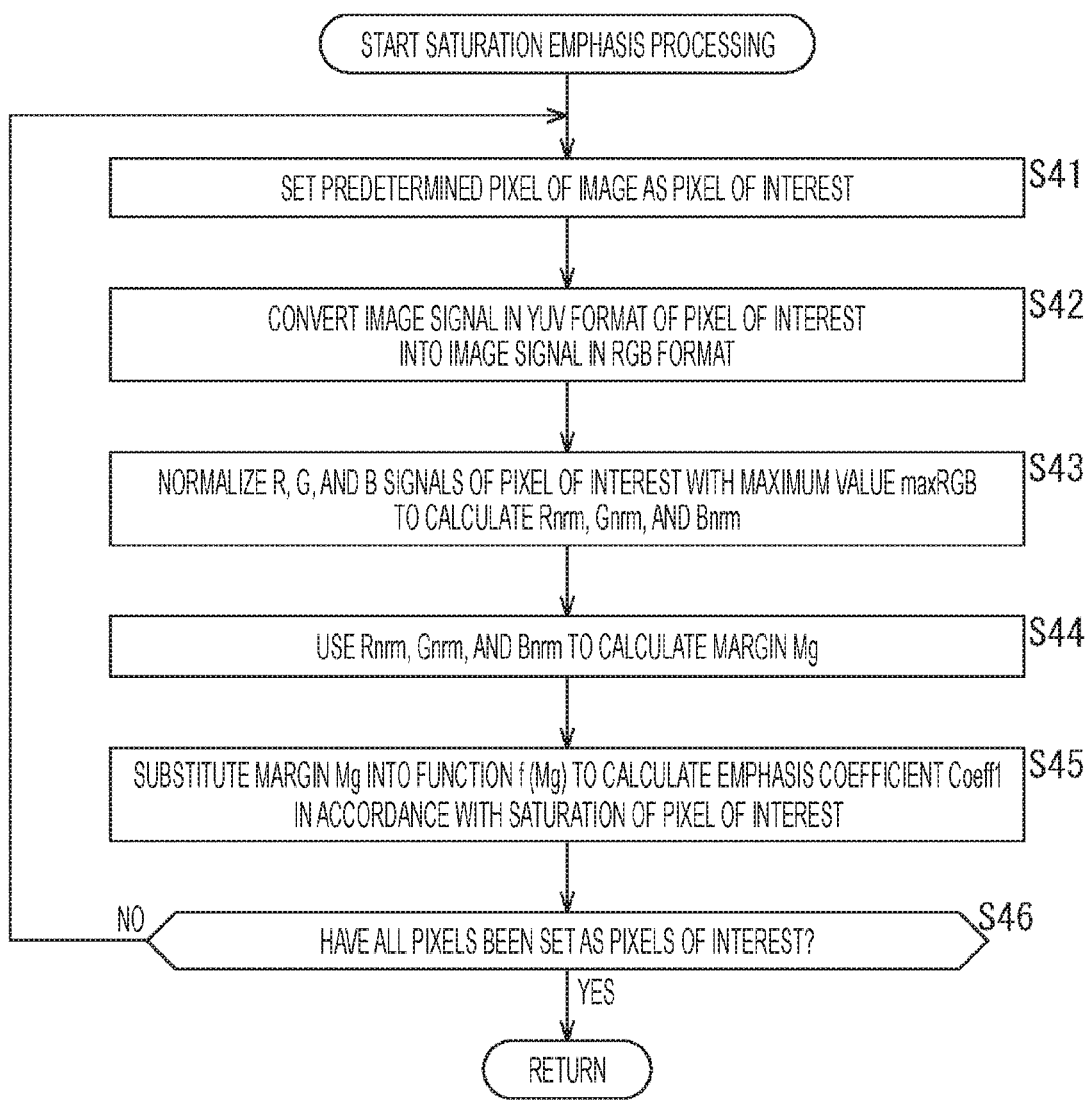
FIG. 20 is a flowchart for describing saturation emphasis processing.

FIG. 20 is a flowchart for describing details of the saturation emphasis processing in step S1, and is a flowchart of the saturation emphasis processing in a case where the emphasis coefficient Coeff1 is calculated on the basis of R, G, and B values of a pixel.

In the flowchart in FIG. 20, first, in step S41, the saturation emphasis processing unit 71 sets a predetermined pixel of the image supplied from the image quality adjustment processing unit 41 as a pixel of interest.

In step S42, the saturation emphasis processing unit 71 converts an image signal in the YUV format of the pixel of interest into an image signal in the RGB format (R, G, and B signals).

In step S43, the saturation emphasis processing unit 71 calculates Rnrm, Gnrm, and Bnrm by normalizing the R, G, and B signals of the pixel of interest with maxRGB, which is the maximum value among the values that the R, G, and B signals may have.

In step S44, the saturation emphasis processing unit 71 calculates a margin Mg by using Rnrm, Gnrm, and Bnrm, which are the normalized R, B, and G signals of the pixel of interest. In other words, the saturation emphasis processing unit 71 calculates the margin Mg by multiplying Rnrm, Gnrm, and Bnrm by the power coefficients Cr, Cg, and Cb for R, G, and B respectively, and then subtracting the obtained values from 1.

In step S45, the saturation emphasis processing unit 71 calculates (determines) the emphasis coefficient Coeff1 in accordance with saturation of the pixel of interest by substituting the calculated margin Mg into the function $f(Mg)$ that defines the correspondence relationship between the margin Mg and the emphasis coefficient Coeff1. Then, the saturation emphasis processing unit 71 multiplies the luminance signal Y of the pixel of interest by the calculated emphasis coefficient Coeff1 to calculate the emphasized luminance signal Y'. The calculated luminance signal Y' is supplied to the area emphasis processing unit 72 together with the U and V signals.

In step S46, it is determined whether the saturation emphasis processing unit 71 has set all the pixels of the image supplied from the image quality adjustment processing unit 41 as pixels of interest.

In a case where it is determined in step S46 that the saturation emphasis processing unit 71 has not set all the pixels as pixels of interest, the processing returns to step S41. With this arrangement, the processing in steps S41 to S46 described above is repeated. In other words, a predetermined pixel not yet set as a pixel of interest is set as a pixel of interest, the emphasis coefficient Coeff1 in accordance with saturation of the pixel of interest is calculated, and the luminance signal Y' emphasized by the emphasis coefficient Coeff1 is calculated.

On the other hand, in a case where it is determined in step S46 that all the pixels have been set as pixels of interest, the saturation emphasis processing in FIG. 20 ends.

Note that as described above, whether to execute, as the saturation emphasis processing in step S1, the emphasis processing based on the U and V values described with reference to FIG. 19 or the emphasis processing based on the R, G, and B values described with reference to FIG. 20 can be optionally selected on the basis of setting information or the like.

Figure 21:
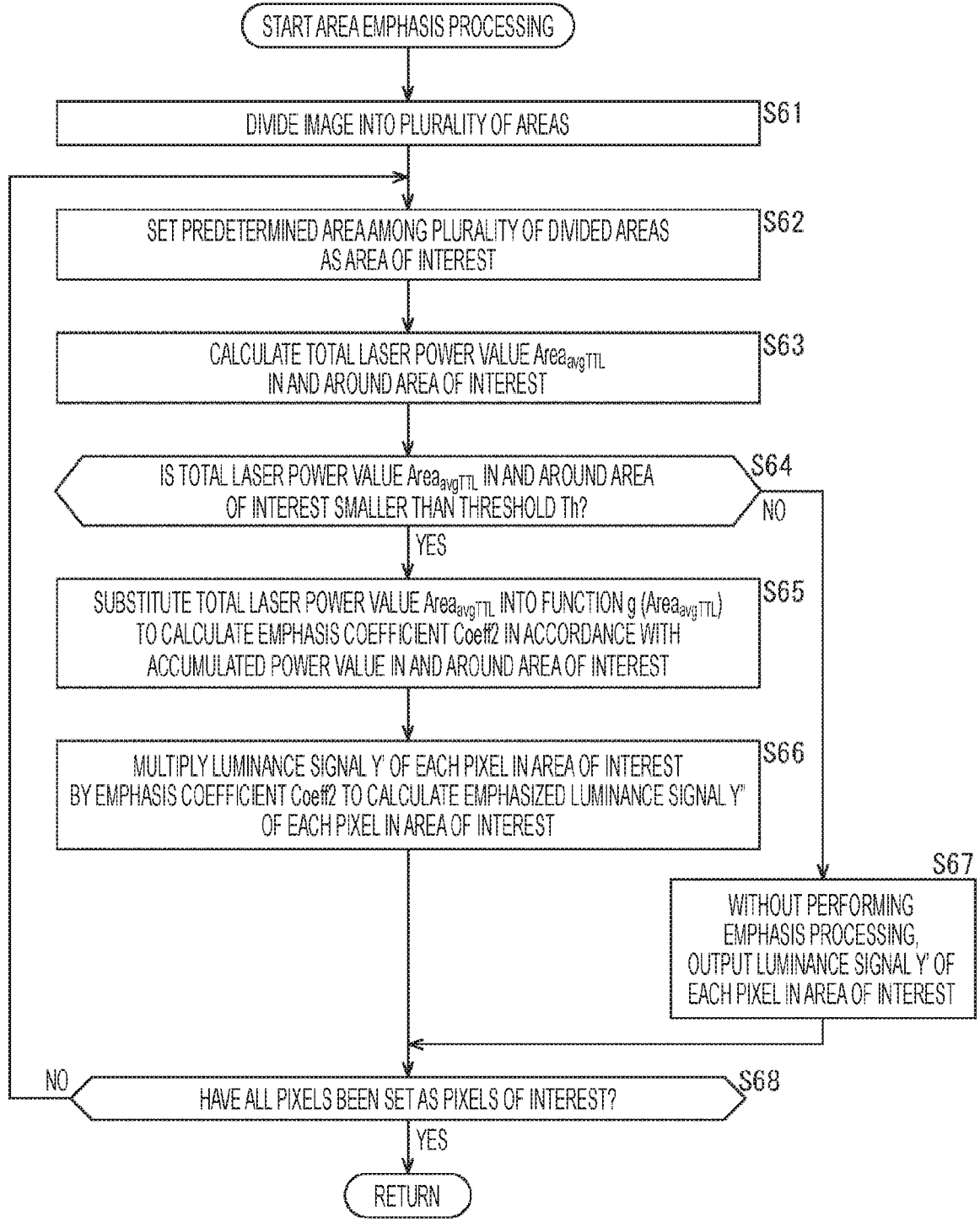
FIG. 21 is a flowchart for describing area emphasis processing.

FIG. 21 is a flowchart for describing details of the area emphasis processing in step S2.

In the flowchart in FIG. 21, first, in step S61, the area emphasis processing unit 72 divides an image supplied from the image quality adjustment processing unit 41 into a plurality of areas. The number of areas to be divided (division number) is determined in advance on the basis of setting information or the like.

In step S62, the area emphasis processing unit 72 sets a predetermined area among the plurality of divided areas as an area of interest.

In step S63, the area emphasis processing unit 72 calculates the total laser power value $Area_{avgTTL}$ in the 3×3 neighboring areas centered on the set area of interest (hereinafter referred to as "in and around the area of interest" as appropriate). Note that as described above, the area for calculating the total laser power value $Area_{avgTTL}$ is determined in relation to the size of a pupil of a human eye and is not limited to the nine (3×3) areas.

In step S64, the area emphasis processing unit 72 determines whether the total laser power value $Area_{avgTTL}$ in and around the area of interest is smaller than the threshold Th determined on the basis of the laser safety standard.

In a case where it is determined in step S64 that the total laser power value $Area_{avgTTL}$ in and around the area of interest is smaller than the threshold Th, the processing proceeds to step S65, and the area emphasis processing unit 72 calculates (determines) the emphasis coefficient Coeff2 in accordance with the accumulated power value in and around the area of interest by substituting the calculated total laser power value $Area_{avgTTL}$ into the function $g(Area_{avgTTL})$ that defines the correspondence relationship between the total laser power value $Area_{avgTTL}$ and the emphasis coefficient Coeff2 as illustrated in FIG. 16.

In step S66, the area emphasis processing unit 72 multiplies the luminance signal Y' of each pixel in the area of interest by the calculated emphasis coefficient Coeff2 to calculate the emphasized luminance signal Y" of each pixel in the area of interest. The calculated luminance signal Y" is supplied to the pixel signal conversion unit 42 together with the U and V signals.

On the other hand, in a case where it is determined in step S64 that the total laser power value $Area_{avgTTL}$ in and around the area of interest is greater than or equal to the threshold Th, the processing proceeds to step S67, and the area emphasis processing unit 72, without performing emphasis processing, outputs directly the luminance signal Y' of each pixel in the area of interest as the luminance signal Y" to the pixel signal conversion unit 42 together with the U and V signals.

After step S66 or S67, the area emphasis processing unit 72 determines in step S68 whether every one of the plurality of divided areas has been set as an area of interest.

In a case where it is determined in step S68 that the area emphasis processing unit 72 has not set all the areas as areas of interest, the processing returns to step S62. With this arrangement, the processing in steps S62 to S68 described above is repeated. In other words, a predetermined area not yet set as an area of interest is set as an area of interest, the emphasis coefficient Coeff2 in accordance with the total laser power value $Area_{avgTTL}$ of the area of interest is calculated, and the luminance signal Y" emphasized by the emphasis coefficient Coeff2 is calculated.

On the other hand, in a case where it is determined in step S68 that every one of the plurality of divided areas has been set as an area of interest, the area emphasis processing in FIG. 21 ends.

As described above, in the projection apparatus 1, the emphasis processing unit 61 emphasizes the luminance signal Y of the image supplied from the image quality adjustment processing unit 41 by using the emphasis coefficient Coeff1 in accordance with the saturation of the image, and further emphasizes the luminance signal Y by using the emphasis coefficient Coeff2 in accordance with the accumulated laser power value for each area. With this arrangement, it is possible to improve brightness of a projected image while satisfying the safety standard for laser products.

A human eye has a characteristic called the Helmholtz-Kohlrausch effect, which causes the human eye to perceive a highly saturated image as bright when the human eye sees such an image. A laser light source, due to its characteristics, can reproduce a wide range of colors, and has an effect of causing a highly saturated image to be perceived as brighter than a normal light source does. Moreover, the saturation emphasis processing unit 71 performs saturation emphasis processing to emphasize luminance in accordance with saturation. This allows an image to be expressed more brightly and vividly.

Furthermore, the area emphasis processing unit 72 performs area emphasis processing to analyze brightness of an image and emphasize the power of emitting light for each part (area) of the image. This allows even a dark image having a low accumulated power value to be expressed as a brighter image.

Note that although the emphasis processing unit 61 has a configuration that includes both the saturation emphasis processing unit 71 and the area emphasis processing unit 72, the configuration may include only one of them. Even in a case where either the emphasis processing by the saturation emphasis processing unit 71 or the emphasis processing by the area emphasis processing unit 72 is performed, an effect of improving brightness of a projected image can be obtained.

<9. Other Configuration Examples of Projection Apparatus>

In the embodiment described above, emphasis processing is performed as a part of processing to be executed by the controller 21. Alternatively, the processing to be performed by the emphasis processing unit 61 may be performed by an image processing apparatus disposed separately from the controller 21.

Figure 22:
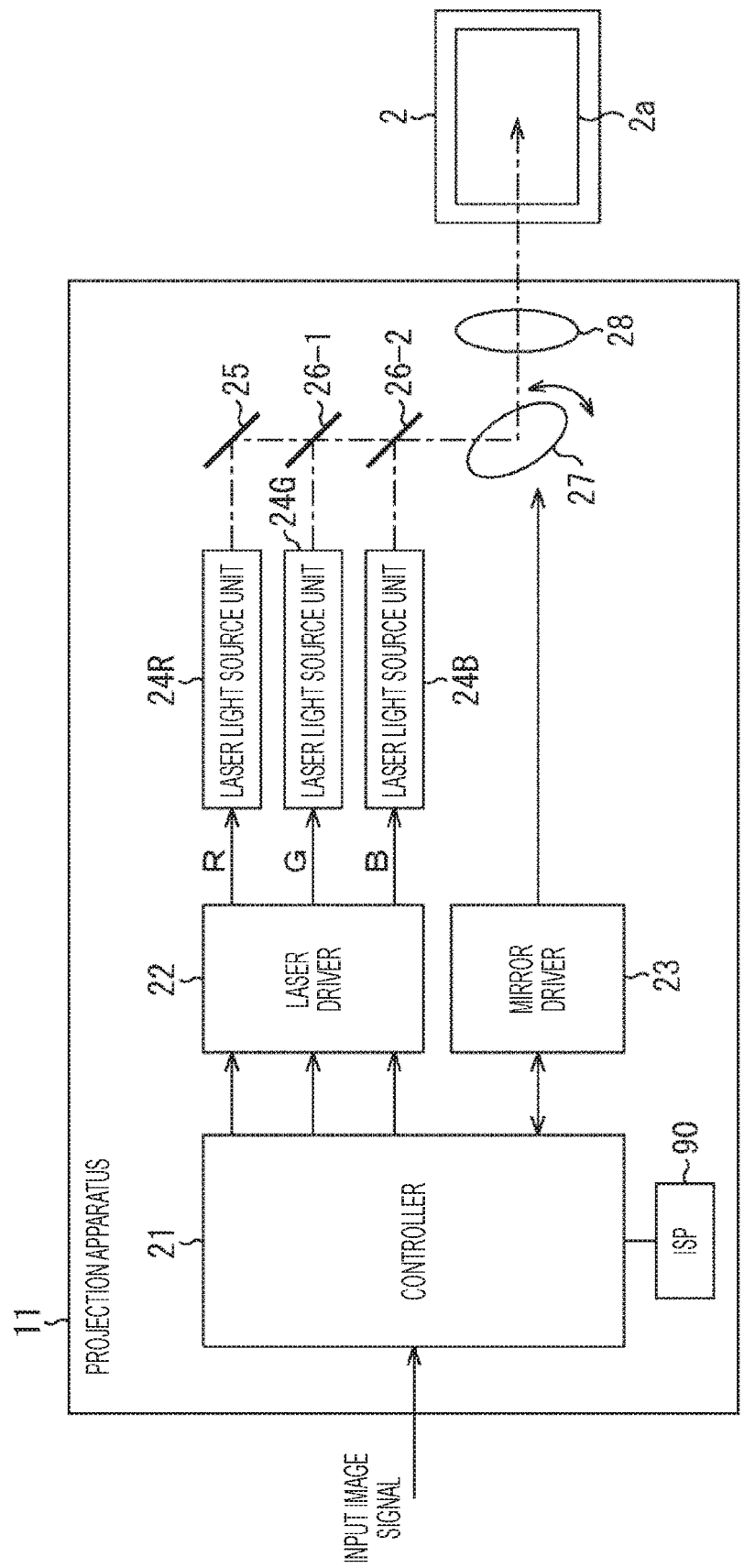
FIG. 22 is a block diagram illustrating another configuration example of a projection apparatus to which the present technology is applied.

For example, the projection apparatus may have a configuration in which an image signal processor (ISP) 90 is disposed separately from the controller 21 as illustrated in FIG. 22, and the ISP 90 as an image processing apparatus performs the emphasis processing to be performed by the emphasis processing unit 61.

<10. Configuration Example of Computer>

Alternatively, the processing to be performed by the emphasis processing unit 61 may be executed by a general-purpose computer or the like as an image processing apparatus.

Figure 23:
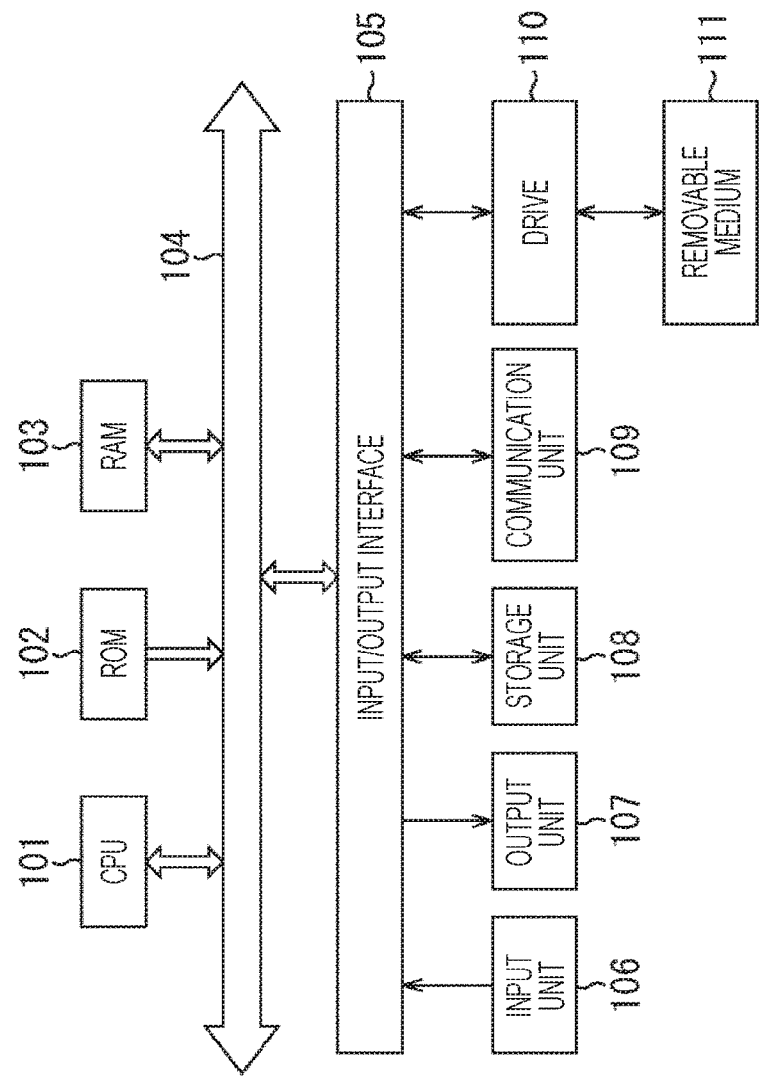
FIG. 23 is a block diagram illustrating a configuration example of a computer to which the present technology is applied.

FIG. 23 illustrates a configuration example of a computer in a case where the processing to be performed by the emphasis processing unit 61 is executed by a general-purpose computer or the like as an image processing apparatus.

This computer has a built-in central processing unit (CPU) 101. The CPU 101 is connected with an input/output interface 105 via a bus 104. The bus 104 is connected with a read only memory (ROM) 102 and a random access memory (RAM) 103.

The input/output interface 105 is connected with an input unit 106, an output unit 107, a storage unit 108, and a communication unit 109. The input unit 106 includes an input device such as a keyboard, a mouse, a microphone, a touch panel, or an input terminal. The output unit 107 includes a display, a speaker, an output terminal, or the like. The storage unit 108 includes a hard disk, a RAM disk, a non-volatile memory, or the like for storing programs and various data. The communication unit 109 includes a local area network (LAN) adapter or the like and executes communication processing via a network as represented by the Internet. Furthermore, the input/output interface 105 is connected with a drive 110 for reading and writing data on a removable medium 111 such as a magnetic disk, an optical disk, a magneto-optical disk, or a semiconductor memory.

The CPU 101 executes various types of processing in accordance with a program loaded from the storage unit 108 into the RAM 103. The RAM 103 also stores, as appropriate, data or the like necessary for the CPU 101 to execute various types of processing.

To perform the series of processing described above, the computer configured as described above causes the CPU 101 to, for example, load a program stored in the storage unit 108 into the RAM 103 via the input/output interface 105 and the bus 104 and then execute the program.

The program to be executed by the computer (CPU 101) can be provided by, for example, being recorded on the removable medium 111 as a package medium or the like. Furthermore, the program can be provided via a wired or wireless transmission medium such as a local area network, the Internet, or digital satellite broadcasting.

Inserting the removable medium 111 into the drive 110 allows the computer to install the program into the storage unit 108 via the input/output interface 105. Furthermore, the program can be received by the communication unit 109 via a wired or wireless transmission medium and installed into the storage unit 108. In addition, the program can be installed in advance in the ROM 102 or the storage unit 108.

Note that the program to be executed by the computer may be a program that performs the series of processing in chronological order as described in the present specification, or may be a program that performs the series of processing in parallel or when needed, for example, when the processing is called.

<11. Example of Application to Electronic Equipment as Projection Module>

Moreover, while the projection apparatus 1 is configured alone in the example described above, the projection apparatus 1 may be, for example, designed as a projection module having about one chip and may be embedded in electronic equipment such as a mobile phone, a smartphone, a mobile terminal, or an imaging device such as a digital still camera or a video camera so as to project an image stored in the electronic equipment or an image received through communication, for example.

Figure 24:
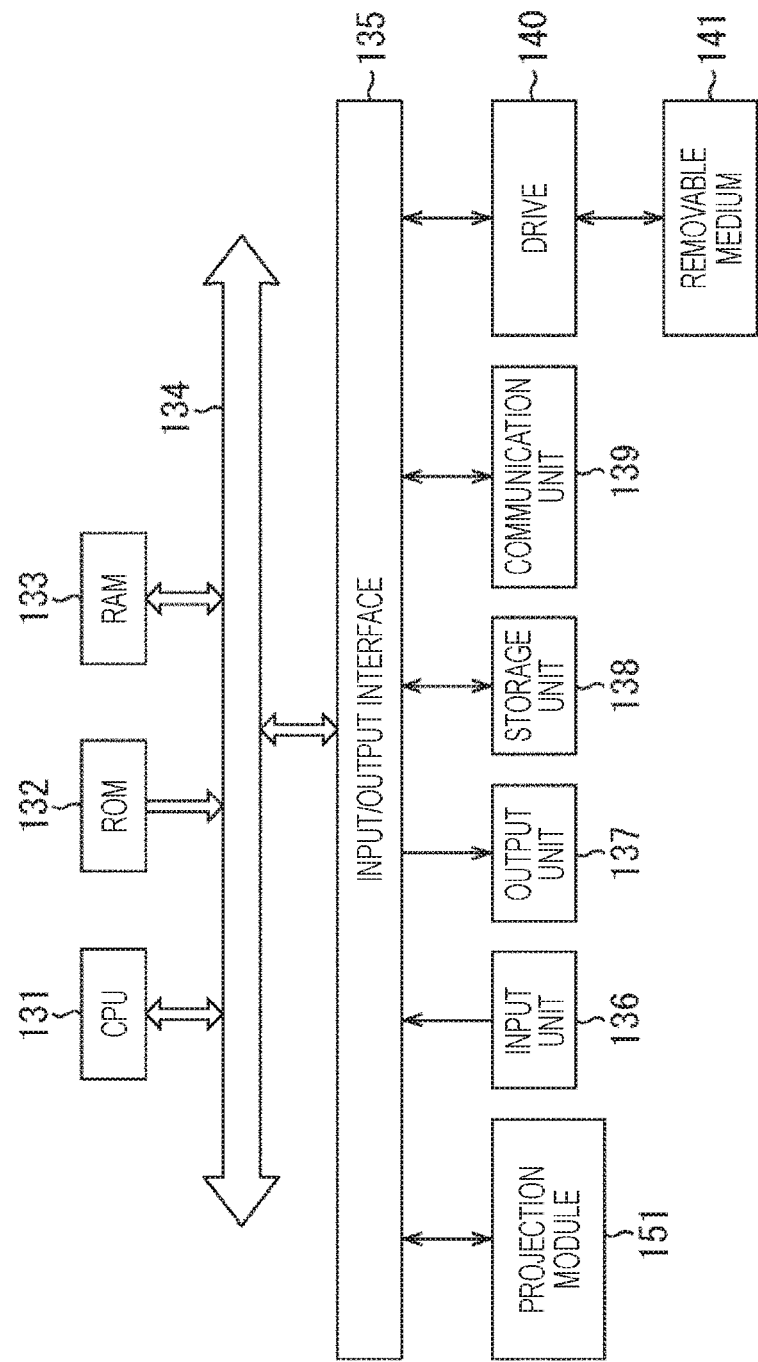
FIG. 24 is a block diagram illustrating a configuration example of electronic equipment to which the present technology is applied.

FIG. 24 illustrates a configuration example of electronic equipment including a projection module 151 including functions as the projection apparatus 1 in FIG. 1 as a module in one chip. Here, the functions and configurations of a CPU 131 to a removable medium 141 are substantially the same as those of the CPU 101 to the removable medium 111, and therefore the description thereof is omitted. Still, the CPU 131 to the removable medium 141 of the electronic equipment in FIG. 24 are generally designed to be more compact and more portable than the CPU 101 to the removable medium 111. Note that the projection module 151 has the same function as that of the projection apparatus 1 in FIG. 1, and therefore the description thereof is omitted.

Embodiments of the present technology are not limited to the embodiment described above but can be modified in various ways within a scope of the present technology.

The embodiment described above adopts a configuration in which the emphasis coefficient Coeff1 and the emphasis coefficient Coeff2 are calculated by substituting predetermined values into the function $f(\Delta UV)$, the function $f(Mg)$, and the function $g(Area_{avgTTL})$. Alternatively, the emphasis coefficient Coeff1 and the emphasis coefficient Coeff2 may be determined (calculated) by holding a table that stores correspondence relationships similar to those defined by a function $f(\ )$ or a function $g(\ )$ and referring to the table.

For example, the present technology can have a cloud computing configuration in which a plurality of apparatuses shares one function and collaborates in processing via a network.

Furthermore, each step described in the flowcharts described above can be executed by one apparatus or can be shared by a plurality of apparatuses.

Moreover, in a case where a plurality of types of processing is included in one step, the plurality of types of processing included in that step can be executed by one apparatus or can be shared by a plurality of apparatuses.

Note that the effects described in the present specification are merely examples and are not restrictive, and effects other than those described in the present specification may be obtained.

Note that the present technology can also be configured as described below.

(1)

An image processing apparatus including a saturation emphasis processing unit that determines, in accordance with saturation of an image, a first emphasis coefficient that emphasizes luminance of the image, and converts a luminance signal of the image on the basis of the determined first emphasis coefficient.

(2)

The image processing apparatus according to (1), in which the saturation emphasis processing unit determines the first emphasis coefficient in accordance with an absolute value of a color-difference component of each pixel of the image.

(3)

The image processing apparatus according to (2), in which the saturation emphasis processing unit determines the first emphasis coefficient by substituting either an absolute value of a Cr component or an absolute value of a Cb component of each pixel, whichever is larger, into a first function.

(4)

The image processing apparatus according to (3), in which in the first function, the first emphasis coefficient increases as a value substituted into the first function is closer to 0.5.

(5)

The image processing apparatus according to (1), in which the saturation emphasis processing unit determines the first emphasis coefficient in accordance with R, G, and B values of each pixel of the image.

(6)

The image processing apparatus according to (5), in which the saturation emphasis processing unit normalizes the R, G, and B values of each pixel of the image, and determines the first emphasis coefficient on the basis of results of multiplying the normalized R, G, and B values by ratios of R, G, and B respectively.

(7)

The image processing apparatus according to (6), in which the saturation emphasis processing unit determines the first emphasis coefficient by substituting, into a first function, a value computed by using the results of multiplying the normalized R, G, and B values by the ratios of R, G, and B respectively.

(8)

The image processing apparatus according to (7), in which in the first function, the first emphasis coefficient increases as the computed value increases.

(9)

The image processing apparatus according to any one of (1) to (8), further including an area emphasis processing unit that divides the image into a plurality of areas, determines for each of the areas a second emphasis coefficient that emphasizes luminance of the image, and converts a luminance signal of the image on the basis of the determined second emphasis coefficient.

(10)

The image processing apparatus according to (9), in which the area emphasis processing unit determines the second emphasis coefficient of an area of interest, which is a target area among the plurality of areas, by calculating a total power value in areas within and neighboring the area of interest and, in a case where the total power value is smaller than a predetermined threshold, substituting the total power value into a second function.

(11)

The image processing apparatus according to (9) or (10), in which a size of each of the areas is smaller than a size of a pupil of a human eye, and a combined size of areas within and neighboring the area of interest, which is a size of an area for calculating the total power value, is larger than the size of a pupil of a human eye.

(12)

An image processing method including:

determining, by an image processing apparatus, an emphasis coefficient that emphasizes luminance of an image in accordance with saturation of the image; and converting, by the image processing apparatus, a luminance signal of the image on the basis of the determined emphasis coefficient.

(13)

A projection apparatus including:

a saturation emphasis processing unit that determines, in accordance with saturation of an input image, an emphasis coefficient that emphasizes luminance of the image, and converts a luminance signal of the image on the basis of the determined emphasis coefficient;

a laser light source unit that outputs a laser beam in accordance with a pixel signal of the image obtained by converting the luminance signal; and a scanning unit that reflects the laser beam and performs scanning with the laser beam in a horizontal direction and a vertical direction.

REFERENCE SIGNS LIST

1 Projection apparatus
2a Projection image
21 Controller
22 Laser driver
23 Mirror driver
24R, 24G, 24B Laser light source unit
27 Drive mirror
61 Emphasis processing unit
71 Saturation emphasis processing unit
72 Area emphasis processing unit
90 ISP
101 CPU
102 ROM
103 RAM
106 Input unit
107 Output unit
108 Storage unit
109 Communication unit
110 Drive
151 Projection module

The invention claimed is:

1. An image processing apparatus, comprising:
a saturation emphasis processing unit configured to:
determine, for a first function, a specific value that is larger among an absolute value of a Cr component and an absolute value of a Cb component of each pixel of an image;
determine a first emphasis coefficient that emphasizes luminance of the image, wherein the first emphasis coefficient is determined based on saturation of the image and substitution of the specific value into the first function; and
convert a first luminance signal of the image based on the determined first emphasis coefficient.

2. The image processing apparatus according to claim 1, wherein in the first function, the first emphasis coefficient increases as the specific value substituted into the first function is closer to 0.5.

3. The image processing apparatus according to claim 1, wherein the saturation emphasis processing unit is further configured to determine the first emphasis coefficient based on R, G, and B values of each pixel of the image.

4. The image processing apparatus according to claim 3, wherein the saturation emphasis processing unit is further configured to:
normalize the R, G, and B values of each pixel of the image; and
determine the first emphasis coefficient based on results of multiplication of the normalized R, G, and B values by ratios of R, G, and B respectively.

5. The image processing apparatus according to claim 4, wherein
the saturation emphasis processing unit is further configured to determine the first emphasis coefficient based on substitution of a value into a second function, and
the value substituted into the second function is based on the results of multiplication of the normalized R, G, and B values by the ratios of R, G, and B respectively.

6. The image processing apparatus according to claim 5, wherein in the second function, the first emphasis coefficient increases as the value substituted in the second function increases.

7. The image processing apparatus according to claim 1, further comprising an area emphasis processing unit configured to:
divide the image into a plurality of areas;
determine, for each of the plurality of areas, a second emphasis coefficient that emphasizes luminance of the image; and
convert a second luminance signal of the image based on the determined second emphasis coefficient.

8. The image processing apparatus according to claim 7, wherein the area emphasis processing unit is further configured to:
calculate a total power value in areas within and neighboring an area of interest which is a target area among the plurality of areas;
determine the second emphasis coefficient of the area of interest; and
substitute the total power value into a second function in a case where the total power value is smaller than a threshold power value.

9. The image processing apparatus according to claim 8, wherein
a size of each of the plurality of areas is smaller than a size of a pupil of a human eye, and
a combined size of the areas within and neighboring the area of interest, which is a size of an area to calculate the total power value, is larger than the size of the pupil of the human eye.

10. An image processing method, comprising:
determining, by an image processing apparatus, a specific value that is larger among an absolute value of a Cr component and an absolute value of a Cb component of each pixel of an image, for a function;
determining, by the image processing apparatus, an emphasis coefficient that emphasizes luminance of the image, wherein the emphasis coefficient is determined based on saturation of the image and substitution of the specific value into the function; and
converting, by the image processing apparatus, a luminance signal of the image based on the determined emphasis coefficient.

11. A projection apparatus, comprising:
a saturation emphasis processing unit configured to:
determine, for a function, a specific value that is larger among an absolute value of a Cr component and an absolute value of a Cb component of each pixel of an image;
determine an emphasis coefficient that emphasizes luminance of the image wherein the emphasis coefficient is determined based on saturation of the image and substitution of the specific value into the function; and
convert a luminance signal of the image based on the determined emphasis coefficient;
a laser light source unit configured to output a laser beam based on a pixel signal of the image obtained by conversion of the luminance signal; and
a scanning unit configured to:
reflect the laser beam; and
execute a scanning process with the laser beam in a horizontal direction and a vertical direction.

12. An image processing apparatus, comprising:
a saturation emphasis processing unit configured to:
normalize R, G, and B values of each pixel of an image;
determine, based on saturation of the image and results of multiplication of the normalized R, G, and B values by ratios of R, G, and B respectively, an emphasis coefficient that emphasizes luminance of the image; and
convert a luminance signal of the image based on the determined emphasis coefficient.

13. An image processing apparatus, comprising:
a saturation emphasis processing unit configured to:
determine, based on saturation of an image, a first emphasis coefficient that emphasizes luminance of the image; and
convert a first luminance signal of the image based on the determined first emphasis coefficient; and
an area emphasis processing unit configured to:
divide the image into a plurality of areas;
calculate a total power value in areas within and neighboring an area of interest which is a target area among the plurality of areas;
substitute the total power value into a function in a case where the total power value is smaller than a threshold power value;
determine, for the area of interest, a second emphasis coefficient that emphasizes the luminance of the image, wherein the second emphasis coefficient is determined based on the substitution of the total power value into the function; and convert a second luminance signal of the image based on the determined second emphasis coefficient.

\* \* \* \* \*